(12) United States Patent
Ferre Herrero

(10) Patent No.: US 7,050,580 B1
(45) Date of Patent: May 23, 2006

(54) RANDOMIZATION-ENCRYPTION SYSTEM

(76) Inventor: Angel José Ferre Herrero, Ay, Constitucio, 3 bis, 43540 Sant Carles de la Rapita (ES)

(*) Notice: Subject to any disclaimer, the term of this patent is extended or adjusted under 35 U.S.C. 154(b) by 0 days.

(21) Appl. No.: 09/674,950

(22) PCT Filed: Apr. 30, 1999

(86) PCT No.: PCT/ES99/00115

§ 371 (c)(1),
(2), (4) Date: Jan. 10, 2001

(87) PCT Pub. No.: WO99/57845

PCT Pub. Date: Nov. 11, 1999

(30) Foreign Application Priority Data

May 7, 1998 (ES) ................. 9801037
Jun. 22, 1998 (ES) ................. 9801398

(51) Int. Cl.
*G06F 17/00* (2006.01)

(52) U.S. Cl. ............ 380/28; 380/46; 380/268

(58) Field of Classification Search ........... 380/28–30, 380/37, 43, 255, 46, 268; 713/181
See application file for complete search history.

(56) References Cited

U.S. PATENT DOCUMENTS

| | | | | |
|---|---|---|---|---|
| 3,798,360 A | * | 3/1974 | Feistel | 380/37 |
| 4,316,055 A | * | 2/1982 | Feistel | 380/37 |
| 4,969,190 A | * | 11/1990 | Takaragi et al. | 380/43 |
| 5,214,703 A | * | 5/1993 | Massey et al. | 380/37 |
| 5,673,319 A | * | 9/1997 | Bellare et al. | 713/181 |
| 6,128,737 A | * | 10/2000 | Jakubowski et al. | 713/181 |

OTHER PUBLICATIONS

Alfred J. Menezes et al, 1996, CRC Press, Handbook of Applied Cryptography, 228-230, 264.*
Bruce Schneier, 1996, John Wiley & Sons, Inc., "Applied Cryptography", 194.*
Design and implementation of Rijndael algorithm for GSM encryption Soyjaudah, K.M.S.; Hosany, M.A.; Jamaloodeen, A.; Mobile Future, 2004 and the Symposium on Trends in Communications. SympoTIC '04/ Joint IST Workshop on Oct. 24-26, 2004 Page(s):106-109.*
A block cipher technique for security data and computer networks Rahouma, K.H.; Internet Workshop, 1999. IWS 99 Feb. 18-20, 1999 Page(s):25-31.*
An encryption scheme for large Chinese texts Bao-Chyuan Guan; Ray-I Chang; Yung Chung Wei; Chia-Ling Hu; Yu-Lin Chiu; Security Technology, 2003. Proceedings. IEEE 37th Annual 2003 International Carnahan Conference on Oct. 14-16, 2003 Page(s):564-568.*

* cited by examiner

Primary Examiner—David Jung
(74) Attorney, Agent, or Firm—Steinberg & Raskin, P.C.

(57) ABSTRACT

Data sequence randomization encryption system such that having supplied data sequence (X) and randomization-encryption key (Kp) generates random data sequence (Yp), so that laypersons in encryption are able to measure objectively the diffusion and confusion of the generated sequence (Yp) with the particular randomization-encryption key (Kp) which has been used. Data sequence (X) is divided into blocks (XI), each block (XI) gets into group with transformer block (WTI), generated by transformer block generator (1002) by making use of control initial block (R) and previous output block (YI), resulting in grouped block (VI), result of the group, which is encrypted by means of the device in U.S. Pat. No. 5,214,703 (204), generating output block (YI) which is supplied to transformer block generator (1002), the succession of output blocks (YI) results in output randomized-encrypted sequence (Yp).

22 Claims, 12 Drawing Sheets

RANDOMIZATION-ENCRYPTION SYSTEM

FIELD OF THE INVENTION

This invention, as expressed by the title of the descriptive report, refers to a system for randomization-encryption of digital data sequence with a freely selectable key where encrypted data sequence is substantially at random, with the corresponding device to retrieve the abovementioned digital data sequence from the randomized-encrypted sequence making use of the selectable key which has been used for randomization-encryption.

This invention is specially suitable for application in secret communications, preserving privacy of information, electronic commerce transactions, electronic mail communication and the like.

BACKGROUND OF THE INVENTION

As it is known in cryptology, encryption techniques (codification) are used so that data exposed to undesired peeking are usually encrypted so that it is difficult for someone not authorized to see or use them.

As it is usually used in encryption, the term "plaintext" refers to a text which has not been coded or encrypted and it is usually directly readable, and the terms "ciphertext" or "encrypted text" are used to refer to a text which has been coded, encrypted. Experts in this art will also assert that, despite of its name, "plaintext" tries to include not only textual data but also binary data, both as a file, a computer file for instance, as well as serial data transferred, for instance, from a communication system such as satellite, telephone or electronic mail systems amongst others.

It is well known amongst those with some knowledge in this area that, up to now, a large number of encryption schemes have been used. For the time being, using the encryption devices, amongst which can be mentioned some as the "Data Encryption Standard" ("DES"), by the "American National Bureau of Standards", currently "National Institute of Standards and Technology" ("NBS" or "NIST") in the United States; the "Fast data encipherment algorithm FEAL" (FEAL) developed later in Japan, IECEJ Technical Report IT 86-33 (1986) and object of U.S. Pat. No. 4,850,019 entitled "Data Randomization Equipment"; the encryption device in U.S. Pat. No. 5,214,703 entitled "Device for the conversion of a digital block and use of same"; as well as the encryption device in U.S. Pat. No. 5,675,653 entitled "Method and apparatus for digital encryption", the entity or user making use of them, after encryption or enciphering of a plaintext, has always delegated the strength of the vulnerability of the encryption in front of an enemy attack aiming to discover the contents of the ciphertext or the encryption key used, trusting in the organizations, institutions, or experts endorsing its security, as well as the degree of diffusion and confusion of values introduced by the encryption device used in the ciphertext. The user or entity encrypting a particular plaintext has no objective security in the degree of diffusion and confusion present in the ciphertext resulting from the application of the encryption device.

Randomization of the input block has been previously adduced, as in the device in U.S. Pat. No. 4,850,019 entitled "Data randomization equipment", invented by Yokosuka Akihiro Shimizu and Yokohama Shoji Miyaguchi, both from Japan, in which two encrypting devices are presented. In both cases the randomization of data which they refer to is done according to the individual 64 bit data block provided as input, as described in the patent description where it is stated that "final channel data obtained after function and transform operations are combined in combining means to produce randomized data corresponding to the input data". It can also be mentioned that such invention uses a 64 bit encryption key for the first encrypting device, and a 128 bit encryption key for the second.

The encryption device in U.S. Pat. No. 5,214,703 entitled "Device for the conversion of a digital block and use of same", invented by James L. Massey and Xuejia Lai, both from Switzerland, is another encrypting device whose resulting ciphertext presents no such properties to allow objective measures, by the user or entity using the device, of the degree of diffusion and confusion of values presented in the mentioned ciphertext and, as it happened with the abovementioned device, the diffusion and confusion introduced refer to the 64 bit input block provided for encryption. It is mentioned in the description of this mentioned patent that "it can be proved that the quantity of four operations is a minimum for meeting the object of diffusion", therefore relegating to experts, organizations or institutions, the appraisal of the diffusion and confusion introduced in the ciphertext resulting from its application. Such a device makes use of a 128 bit encryption key.

Another example of encryption device where a good mixture in the resultant ciphertext is adduced is that one object of U.S. Pat. No. 5,675,653 entitled "Method and apparatus for digital encryption", invented by Nelson Douglas Valmore, Jr. In the mentioned patent it is alluded that experts, people with good knowledge in cryptology, will recognize that typical digital encryption techniques usually use two well-known techniques such as substitution and transposition; but this device does not yield such a ciphertext that it is possible for a layperson to verify the mixture achieved in the resultant ciphertext in an objective way.

Mention must be given to U.S. Pat. No. 3,798,360 entitled "Step Code Ciphering System", invented by Horst Feistel, which makes use of an internal block cipher (22 in FIG. 1 of that patent) and part of the resulting ciphertext as input for the enciphering of the rest of the plaintext block. In the mentioned patent it is stated that "Each block cipher developed by a cryptographic device is comprised in part of data that has been twice enciphered by the same cryptographic device." and "A portion of the cipher text developed during the first encryption is stored and the remaining portion is re-enciphered in combination with new data bits to form a second ciphertext which is combined with the stored portion of the first cipher text to form a new composite block cipher that is transmitted.". The enciphering of the stream data is done on a block basis, being the basic feature of the system that each composite block cipher is formed by a portion of ciphertext that has been encrypted twice. Regarding the resulting ciphertext stream, such as the other abovementioned encrypting devices, this patent refers to an encrypting device whose resulting ciphertext stream presents no such properties to allow objective measures, by the user or the entity using the device, of the degree of diffusion and confusion of values presented in the mentioned ciphertext stream.

It is worth mentioning that as regards to the encryption key used for encrypting, for the time being, there exist recommendations about how it should be. Such recommendations are like those found in the Federal Information Processing Standards Publication 112 (FIPS PUB 112), which announces the standard "Password usage", dated from May 30, 1985, published by the "National Institute of Standards and Technology" ("NIST") of the Commerce Department of the US Government. Such recommendations refer to the "password" length, characters which are more advisable to use for its composition, and several limitations in its composition, amongst others. Cryptologists will recognize that passwords are related to encryption keys and are often used as such, as it is recommended in several sections of the same document FIPS PUB 112 such as section 3.9.3 entitled "Transmission" within chapter 3 entitled "Acceptable Basic Criteria"; another reference in the same direction can be found in section 3.7 entitled "Storage" within chapter 3 entitled "Factors" of Appendix A which is entitled "Password Usage Guidelines" as well as in other sections of said document.

The encryption key is one of the basic transforming elements of the plaintext in its encryption, since it is the combination of the operations plus the very operations performed by the encrypting device with the plaintext and the encryption key that yields the ciphertext. The encryption key used is one of the transforming elements, differential and variable in the series of transformations applied on the plaintext in order to produce the resultant ciphertext. The encryption key impacts on the diffusion and confusion present in the ciphertext; thus, amongst all keys that can be used, there exist some which will introduce more diffusion and confusion of values than others in the resultant ciphertext. For the time being, there has never been a presentation of an encryption system which can return, as ciphertext resultant from its application, such a text that there is a measurable and objective way to discern, amongst all encryption keys that could be used, which one or ones produce more diffusion and confusion in the ciphertext resulting from each one.

Consequently, it can be stated that up to now, the same degree of invulnerability of a ciphertext, resulting from the application of a given encryption system, has been attributed to any ciphertext enciphered with any encryption key, based on the opinion of experts about the diffusion and confusion introduced by the used encryption systems. For the time being, encryption devices do not produce as a result a ciphertext with substantial properties to allow an objective measure of the diffusion and confusion present in the ciphertext.

The usage of encryption devices by laypersons is becoming very common, as in commercial electronic transactions or electronic mail amongst others, in which laypersons need the possibility to measure objectively the diffusion and confusion present in the ciphertext by themselves. The availability of an encryption system which produces such a ciphertext that an objective measure of the diffusion and confusion of values is possible would allow laypersons to have a stronger security in the degree of confidentiality of the encrypted information and, therefore, to use the encryption systems with more confidence; this would help encryption systems to have a larger acceptance with a consequent increase in usage and a worldwide strengthening of data communications, electronic mail and commercial electronic transactions amongst others.

Also, as far as the encryption key is concerned, there is no possibility to discern which one introduces more diffusion and confusion, providing more confidence in the ciphertext, due to the unexistence of an encryption system whose ciphertext presents such substantial properties that the diffusion and confusion can be objectively measured and consequently it allows to discriminate amongst several encryption keys that can be tested, which one or ones produce a ciphertext with a larger diffusion and confusion of values.

As mentioned above, those who are experts in cryptology will recognize that one purpose of encryption devices is the introduction of enough diffusion and confusion in the plaintext to be encrypted so that it is not feasible to deduce from the resultant ciphertext, the plaintext object of the encryption or the encryption key used for the encryption. Also, those with some knowledge in the art of random number sequence generators, an art closely related to cryptology, will recognize that it is in random number sequences where the largest degree of diffusion and confusion of values shows up. In order to evaluate such random number sequences a large number of tests exist, like those described in "The Art of Computer Programming—$2^{nd}$ Edition" Volume 2 "Seminumerical Algorithms", by Donald E. Knuth, Addison-Wesley Publishing Company, ISBN:0-201-03822-6(v.2) in pages 54 to 65; or the compulsory tests described in the Federal Information Processing Standards Publication 140-1 (FIPS PUB 140-1), entitled "Security requirements for cryptographic modules", dated from Jan. 11, 1994, by the "National Institute of Standards and Technology" ("NIST") of the Commerce Department of the United States Government, in section 4.11.1 entitled "Power-Up Tests", tests that random number generators must undergo. However, as it is described in lines 13 to 18 within page 35 of the book "The Art of Computer Programming—$2^{nd}$ Edition" Volume 2 "Seminumerical Algorithms", by Donald E. Knuth, Addison-Wesley Publishing Company, ISBN:0-201-03822-6(v.2) mentioned above, the fact that a sequence behaves randomly with respect to a series of tests $T_1, T_2, \ldots, T_n$ does not ensure it would not fail for test $T_{n+1}$; yet each randomness test applied will provide more and more confidence in the randomness of the sequence and, as a result, in the diffusion and confusion of values.

The availability of such an encryption system that the resultant ciphertext would substantially present the properties of random numbers sequences would allow the application of randomness tests in a computationally feasible way, as those mentioned above, to the resultant ciphertext and hence to have an objective measure of the diffusion and confusion present at each ciphertext. Laypersons in the art of cryptology could have, for each ciphertext enciphered by themselves, an objective measure of the diffusion and confusion present in the ciphertext, giving more confidence in the confidentiality of the information. Furthermore, in case an encryption key used on a plaintext did not generate a randomized-encrypted text with enough diffusion and confusion present at it, with no demerit for the abovementioned usual recommendations concerning encryption keys, the plaintext could undergo a new encryption process, using a different encryption key, until the diffusion and confusion obtained were as desired.

OBJECTS AND SUMMARY OF THE INVENTION

This invention is a system for the randomization-encryption of plaintext which is going to be transmitted through a medium, such as a transmission or communication channel, where it can be seen, analized or intercepted. Without limiting the previous statement, a transmission or communication channel for instance can include a computer network, lines of ground or cellular telephone systems, a satellite transmission, a computer disk, and any other means that can be used for data transference in digital form. As it is used here, the term "transmission channel" simply means the medium used for digital data transportation.

Noticing the questions arisen by the current state of the technique, the purpose of this invention is to supply a data encryption system such that the output data sequence is not only encrypted or enciphered, but randomized in such a way that allows the evaluation of the diffusion and confusion present in the encrypted data sequence given as output; and therefore being able to select the encryption key used since an objective measure of the diffusion and confusion of values, which is introduced by this key in the randomized-encrypted text, is available.

Although techniques like the known as CBC (Cipher Block Chaining) mode or Stream Cipher, described in pages 589 to 592 in the book "Redes de ordenadores" ("Computer Networks"), second Edition, authored by Andrew S. Tanenbaum, published by "Prentice-Hall Hispanoamericana, S.A.", ISBN:968-880-176-3, and other similar methods, like those described in the Federal Information Processing Standards Publication 81 (FIPS PUB 81), which announces the standard "DES Modes of Operation", by the "National Institute of Standards and Technology" ("NIST") of the Commerce Department of the Unated States Government, have been used in cryptology for quite a long time, they do not generate by themselves sequences substantially at random to which the application of randomness tests, as those mentioned above, was computationally feasible.

The system of this invention succeeds in generating substantially randomized encrypted data sequences by means of using the block encrypting device in U.S. Pat. No. 5,214,703 entitled "Device for the conversion of a digital block and use of same", which is characterised by the encryption performed in succesive stages, as described in the patent description. The staged encrypting-decrypting device performs both encryption of plaintext and decryption of ciphertext in successive stages. The system of this invention allows also the usage of a longer encryption key depending on the specific implementation of the invention.

According to this invention, the randomization-encryption device includes means for receiving as first input a data sequence and means for receiving as second input a control block. Said control block is divided by control block dividing means into two control initial blocks: control initial block of length G and control initial block of length 2N. Generating means of encryption control subblocks with said control initial block of length 2N generate encryption control subblocks of length M. Transformer block generating means with said control initial block of length G, and with output block of length N whenever it is supplied, generate multitude of transformer blocks. Assembly means assemble data blocks of length N of said data sequence. Grouping means group corresponding said transformer block and corresponding said data block of length N resulting in interblock of length N. Said interblock of length N is supplied as input to the encrypting device in U.S. Pat. No. 5,214,703 where it is grouped with said encryption control subblocks of length M, resulting in output block of length N. Said output block of length N is supplied as output of the randomizing-encrypting device object of this invention and is also supplied to said transformer block generating means which generate corresponding new transformer block for the randomization-encryption of the corresponding next data block of length N. Output means are supplied for transmitting the sequence of randomized-encrypted data consisting of output blocks of length N.

The device which is part of this invention for recovering the data sequence includes means for receiving at first input randomized-encrypted data sequence and means for receiving at second input control block. Said control block is divided by control block dividing means into two control initial blocks: control initial block of length G and control initial block of length 2N. Generating means of decryption control subblocks with said control initial block of length 2N generate decryption control subblocks of length M. Transformer block generating means with said control initial block of length G and with randomized-encrypted data block of length N whenever it is supplied generate multitude of transformer blocks. Assembly means assemble randomized-encrypted data blocks of length N of said randomized-encrypted data sequence. Said randomized-encrypted data block of length N is supplied as input to the encrypting device in U.S. Pat. No. 5,214,703 where it is grouped with said decryption control subblocks of length M, resulting in interblock of length N. Grouping means group corresponding said transformer block and corresponding said interblock of length N resulting in output block of length N. Said output block of length N is supplied as output of the decryption device object of this invention. Said randomized-encrypted data block is supplied to said transformer block generating means which generate corresponding new transformer block for the decryption of the corresponding next randomized-encrypted data block of length N. Output means are provided for transmitting the data sequence consisting of the output blocks of length N, corresponding to the randomized-encrypted data sequence.

Regarding the previous exposition, first variation of the randomization-encryption system object of this invention is such that in both devices the control block consists of the control initial block of length 2N and is supplied directly to generating means of control subblocks of length M with the corresponding elimination of the control block dividing means. The control initial block of length G supplied to the transformer block generating means is fixed beforehand in the devices for the randomization-encryption of the plaintext sequence or the decryption of the randomized-encrypted data sequence. This variation has the disadvantage of making use of a shorter control block.

A third implementation of the randomizing-encrypting device object of this invention includes means for receiving as first input a data sequence and means for receiving as second input a control block. Said control block is divided by control block dividing means into two control initial blocks: control initial block of length G and control initial block of length 2N. Generating means of encryption control subblocks with said control initial block of length 2N generate encryption control subblocks of length M. Transformer block autonomous generating means with said control initial block of length G generate multitude of transformer blocks. Assembly means assemble data blocks of length N of said data sequence. Grouping means group corresponding said transformer block and corresponding said data block of length N resulting in an interblock of length N. Said interblock of length N is supplied as input to the encryption device in U.S. Pat. No. 5,214,703 where it is grouped with said encryption control subblocks of length M, resulting in output block of length N. Said output block of length N is supplied as output of the randomization-encryption device object of this invention. Output means are provided for transmitting the randomized-encrypted data sequence consisting of output blocks of length N.

The device which is part of this invention for recovering the randomized-encrypted data sequence, which has been generated by the third implementation of the randomizing-encrypting device, includes means for receiving as first input a randomized-encrypted data sequence and means for receiving as second input a control block. Said control block is divided by control block dividing means into two control initial blocks: control initial block of length G and control initial block of length 2N. Generating means of decryption control subblocks with said control initial block of length 2N generate decryption control subblocks of length M. Transformer block autonomous generating means with said control initial block of length G generate multitude of transformer blocks. Assembly means assemble randomized-encrypted data blocks of length N of said randomized-encrypted data sequence. Said randomized-encrypted data block of length N is supplied as input of the encryption device in U.S. Pat. No. 5,214,703 where it is grouped with said decryption control subblocks of length M, resulting in interblock of length N. Grouping means group corresponding said transformer block and corresponding said interblock of length N resulting in output block of length N. Said output block of length N is supplied as output of the decryption device object of this invention. Output means are provided for transmitting the data sequence consisting of output blocks of length N.

Regarding the previous exposition of the third implementation, a fourth variation of the randomizing-encrypting device object of this invention is such that the control block consists of the control initial block of length 2N and is supplied directly to the respective generating means of control subblocks of length M with the elimination of the control block dividing means. The control initial block of length G supplied to the transformer block autonomous generating means is fixed beforehand in the device for the randomization-encryption of the plaintext sequence and the decryption of the randomized-encrypted data sequence.

In order to make the understanding of this document easier and as an integral part of it, a series of figures is presented below. These figures illustrate, but do not limit, the object of this invention.

DETAILED DESCRIPTION OF THE INVENTION

Figure 1:
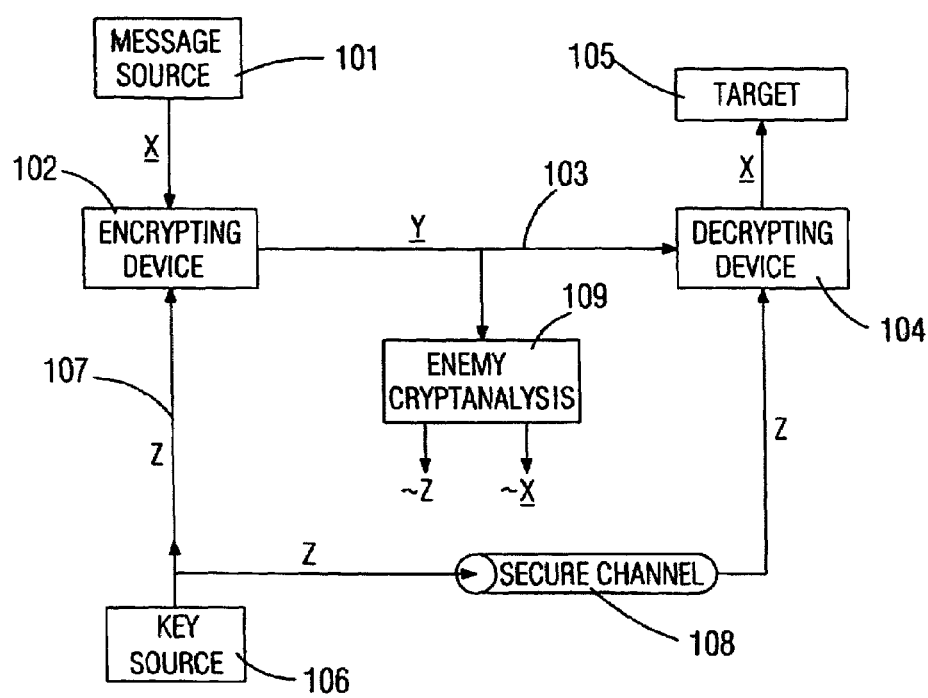
FIG. 1 shows previous art about basic block connections diagram of a system for transmission and treatment of encrypted data.

FIG. 1 shows previous art about diagram of the system commonly used for the transmission and treatment of encrypted data. Data (plaintext sequence $\underline{X}$) to be transmitted are originated in a message source 101, a computer for instance, supplied to an encrypting device 102 and transmitted as ciphertext sequence $\underline{Y}$ through a transmission channel 103. This ciphertext sequence $\underline{Y}$ arrives to the decrypting device 104, at the receiver's side, which feeds the target 105, a second computer for instance, with the plaintext sequence $\underline{X}$. For encryption and decryption of data, the encrypting device 102 and the decrypting device 104 use a control block or encryption key Z. This encryption key Z is supplied from a key source 106 through channel 107 to the encrypting device 102 and through a secure channel 108, which can be a sealed mail for instance, to the decrypting device 104. The ciphertext sequence $\underline{Y}$ in the transmission channel 103 is always exposed to the risk that an enemy cryptanalyst 109 using the ciphertext sequence $\underline{Y}$ will try to obtain the plaintext sequence $\underline{X}$ or the encryption key Z (results of these attempts are designated by $\sim X$ and $\sim Z$).

For the time being, the concealment of the contents of the plaintext sequence $\underline{X}$ in the ciphertext sequence $\underline{Y}$ lies in the endorsement of diffusion and confusion introduced by the encrypting device used in front of enemy cryptanalyst regardless of the encryption key Z being used.

Figure 2:
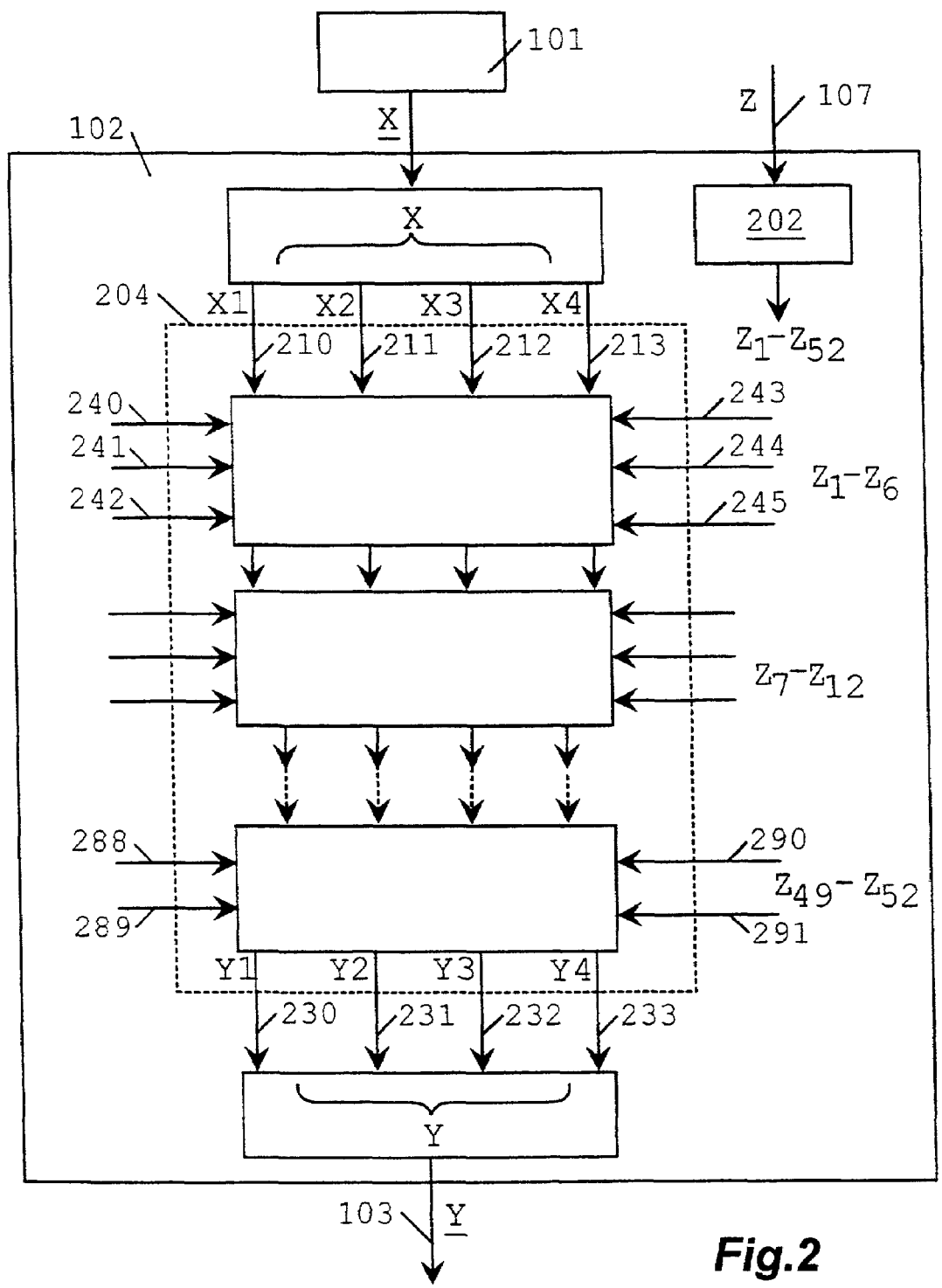
FIG. 2 shows previous art about block interconnection diagram for the block encrypting device in U.S. Pat. No. 5,214,703, which has been included in order to make later references regarding this invention easier.

FIG. 2 shows diagram of encrypting device 102 of FIG. 1, object of U.S. Pat. No. 5,214,703, entitled "Device for the conversion of a digital block and use of same", corresponding with FIG. 2 of said patent report, and which has been included for later reference. The alphabetical references used in FIG. 2 are the same as those used in said FIG. 2 and description of U.S. Pat. No. 5,214,703, so that it is easier to know the object they refer to. The numerical references have been modified in order to adapt them to this document. The encrypting device 102 encrypts the plaintext sequence $\underline{X}$ resulting in the ciphertext sequence $\underline{Y}$ by making use of control block Z, which arrives through channel 107. During the encryption process, control subblocks are encryption control subblocks $Z_1$ to $Z_{52}$, while during the decryption process they are decryption control subblocks $U_1$ to $U_{52}$, which are also derived from control block Z. In the exposition of the implementation methods of this invention, the control block Z will be referred to as control initial block Z. The term control block will be used to designate the randomization-encryption key of this invention. The method for obtaining the encryption control subblocks $Z_{1 \; to \; Z52}$ of the control block Z with the generator of encryption control subblocks 202 is described in said U.S. Pat. No. 5,214,703 making use of same alphanumerical references.

The staged encrypting-decrypting device 204 needed for the encryption process X→Y, where the encryption in successive stages is performed, is represented by a dashed line in FIG. 2 and will be subsequently referenced in that way.

Figure 3:
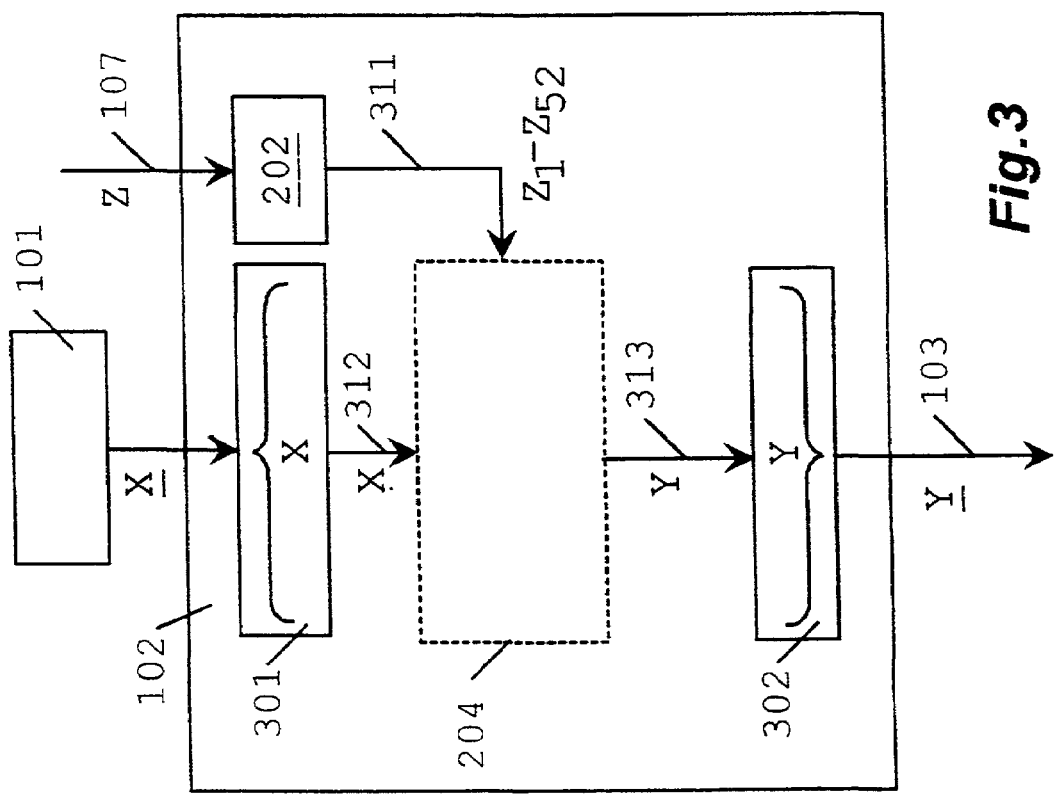
FIG. 3 shows previous art about block interconnection diagram for the block encrypting device in U.S. Pat. No. 5,214,703, schematized with respect to the one represented in FIG. 2, including elements of FIG. 2 which are relevant to the implementation of this invention.

FIG. 3 shows schematized diagram of the encrypting device 102 of FIG. 2 and includes relevant elements for the description of this invention which will be referenced below. In FIG. 3 parts corresponding to parts shown in FIG. 2 are designated by same references. The plaintext sequence $\underline{X}$ to be encrypted arrives continuously from the message source 101 to the input assembly device of block of length N 301. This assembly device can be, for instance, a serial/parallel converter in case of having a serial bit source; this device assembles plaintext blocks of length N X where the preferred length N is equal to 64 bits. Plaintext subblocks of length M X1, X2, X3, X4 of FIG. 2 make up the plaintext block of length N X shown in FIG. 3. This plaintext block of length N X arrives to the encrypting-decrypting device 204 through input 312. Input 312 is the union of the four inputs 210 to 213 of FIG. 2, consisting of 16 parallel lines each one. During the encryption process, control blocks are encryption control subblocks $Z_{1 \; to \; Z52}$, of length M=16 bits each one. Encryption control subblocks $Z_{1 \; to \; Z52}$ are derived from control block Z received through channel 107 in the generator of encryption control subblocks 202 and arrive to the encrypting-decrypting device 204 through input 311. Input 311 represents the union of 52 inputs 240 to 291 in the encrypting-decrypting device 204 of FIG. 2. A ciphertext block of length N Y appears in the output 313 of the encrypting-decrypting device 204. Ciphertext subblocks of length M Y1, Y2, Y3, Y4 of FIG. 2 make up the ciphertext block of length N Y shown in FIG. 3. Output 313 is the union of four outputs 230 to 233 in FIG. 2, consisting of 16 parallel lines each one. This ciphertext block of length N Y is transmitted from the output unit of block of length N 302, for instance a parallel/serial converter. The succession of ciphertext blocks of length N Y results in the ciphertext sequence $\underline{Y}$ transmitted through transmission channel 103.

Figure 4:
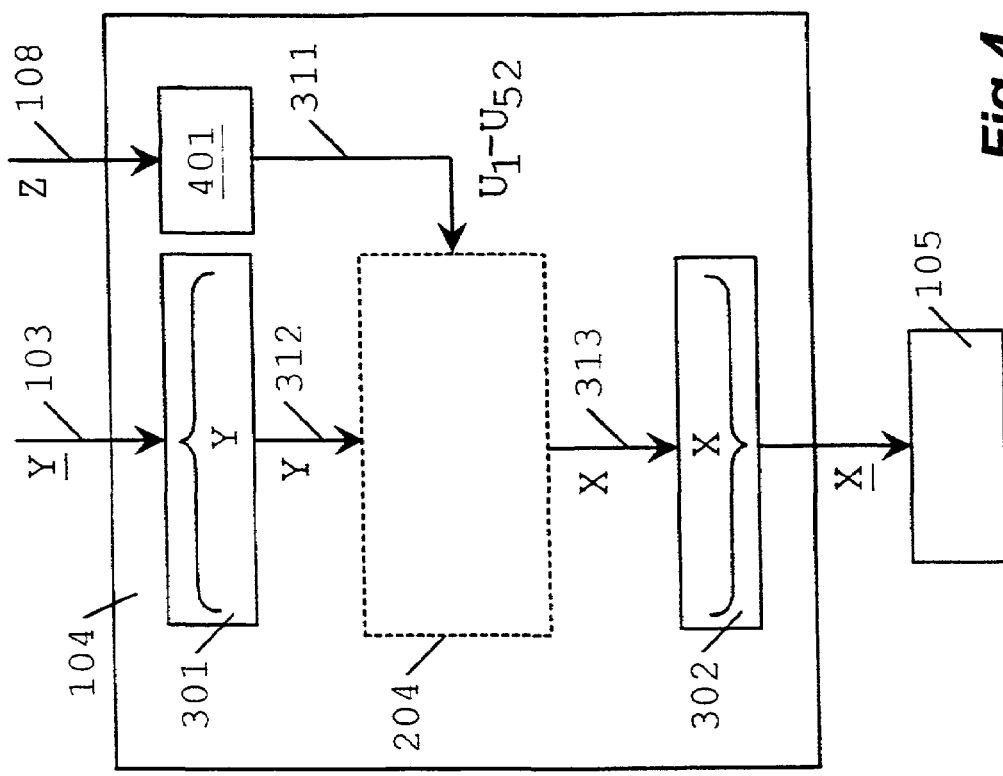
FIG. 4 shows previous art about block interconnection diagram for the block decrypting device in U.S. Pat. No. 5,214,703, schematized with respect to the one represented in FIG. 2, including elements of FIG. 2 which are relevant to the implementation of this invention.

FIG. 4 shows diagram of decrypting device 104, schematized according to the one represented in FIG. 2 of this document, and it includes relevant elements for the description of this invention which will be referenced below. In FIG. 4, parts corresponding to parts shown in FIG. 1, FIG. 2 and FIG. 3 are designated by same references. The ciphertext sequence $\underline{Y}$ arrives to the input assembly device of block of length N 301. This assembly device assembles ciphertext blocks of length N Y where the preferred length N=64 bits, which arrive to the encrypting-decrypting device 204 through input 312. The ciphertext block of length N Y represents the union of four plaintext subblocks of length M X1, X2, X3, X4 of FIG. 2.

During the decryption process, control blocks are decryption control subblocks $U_1$ to $U_{52}$, of length M=16 bits each one, derived from control block Z in the generator of decryption control subblocks 401 as described in said U.S. Pat. No. 5,214,703 making use of same alphanumerical references. In the encrypting-decrypting device 204, the ciphertext block of length N Y and the fiftytwo decryption control subblocks $U_{1 \; to \; U52}$ arriving through input 311 get grouped and result in a plaintext block of length N X with N=64 bits at output 313. The plaintext block of length N X represents the union of four ciphertext subblocks of length M Y1, Y2, Y3, Y4 of FIG. 2. This plaintext block of length N X is transmitted from an output unit of block of length N 302 to target 105. The succession of plaintext blocks of length N X make up the plaintext sequence $\underline{X}$.

Figure 5:
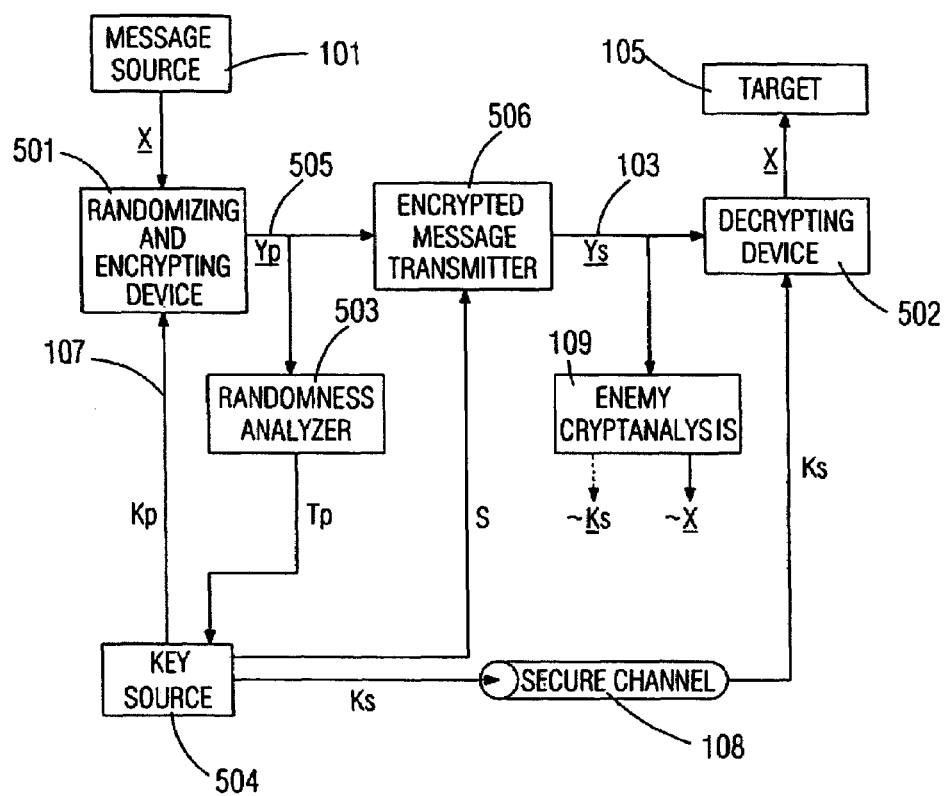
FIG. 5 shows basic block connections diagram of a system for the transmission of randomized-encrypted data making use of the randomizing-encrypting and decrypting devices object of this invention.

FIG. 5 shows possible diagram of a system for the transmission of randomized-encrypted data making use of the randomization-encryption and decryption devices object of this invention. In FIG. 5 parts corresponding to parts shown in FIG. 1 are designated by same references. Data (plaintext sequence $\underline{X}$) are originated in a message source 101, being randomized-encrypted in the randomizing-encrypting device 501 by making use of the randomization-encryption key Kp, resulting in a candidate randomized-encrypted text sequence $\underline{Yp}$. The randomization-encryption key Kp, which in this document will be referred to as control block Kp, is supplied from a key source 504 through channel 107 to the randomizing-encrypting device 501. Amongst many possible system configurations, the candidate randomized-encrypted text sequence $\underline{Yp}$ can reach an encrypted message transmitter 506 through a transmission line 505 while awaiting for results of the application of randomness tests in the randomness analyzer 503.

Considering the substantial properties of random sequences that the candidate randomized-encrypted text sequence $\underline{Yp}$ generated in the randomizing-encrypting device 501 presents, it is amenable to submission to a randomness analysis in a randomness analyzer 503. This randomness analysis is done in order to know the fulfillment of said properties of random sequences and have an objective measure of the diffusion and confusion that the candidate randomized-encrypted text sequence $\underline{Yp}$ presents. The result of the application of randomness tests to the candidate randomized-encrypted text sequence $\underline{Yp}$ in the randomness analyzer 503 is designated as randomness result Tp, which is notified to the key source 504.

Said randomness analyzer 503 can be a hardware or software implementation of a selection or totality of different existing randomness tests, like those described in pages 54 to 65 of "The Art of Computer Programming—$2^{nd}$ Edition" Volume 2 "Seminumerical Algorithms" authored by Donald E. Knuth, Addison-Wesley Publishing Company, ISBN:0-201-03822-6(v.2), or the compulsory tests presented in the Federal Information Processing Standards Publication 140-1 (FIPS PUB 140-1), entitled "Security requirements for cryptographic modules", dated Jan. 11, 1994, of the National Institute of Standards ("NIST") of the Commerce Department of the United States Government, in section 4.11.1 entitled "Power-Up Tests", to which random number sequence generators to be used in governmental cryptographic modules in said country must be submitted. As described in the abovementioned publication "The Art of Computer Programming—$2^{nd}$ Edition" Volume 2 "Seminumerical Algorithms" authored by Donald E. Knuth, Addison-Wesley Publishing Company, ISBN:0-201-03822-6(v.2) in lines 13 to 18 in page 35, the fact that a sequence behaves randomly with respect to tests $T_1, T_2, \ldots, T_n$ does not ensure it would not fail for test $T_{n+1}$. However, each randomness test applied will provide more and more confidence in the randomness of the sequence and, consequently, in the diffusion and confusion of values present in the sequence.

Using the randomness result Tp the key source 504 can take two possible actions. First, it can decide the transmission of the candidate randomized-encrypted text sequence $\underline{Yp}$ through the transmission channel 103 as randomized-encrypted text sequence $\underline{Ys}$, represented by means of transmission signal S, and provide the used control block Kp as selected control block Ks through secure channel 108 to the decrypting device 502. Second, it can decide to select a new control block Kp, submit the plaintext sequence X to a new randomization-encryption in the randomizing-encrypting device 501, and verify the new candidate randomized-encrypted text sequence Yp in the randomness analyzer 503.

The randomized-encrypted text sequence Ys, which is the selected and transmitted candidate randomized-encrypted text sequence Yp, arrives to the decrypting device 502, which feeds the target 105 with the plaintext sequence X. For decryption, the decrypting device 502 uses the selected control block Ks which is supplied from the key source 504 through secure channel 108.

The randomized-encrypted text sequence Ys in the transmission channel 103 is always exposed to the risk that an enemy cryptanalyst 109 tries to obtain the plaintext sequence X or the selected control block Ks (results of these attempts are designated by ~X and ~Ks).

In the encrypting devices existing for the time being, the diffusion and confusion of values present in the ciphertext sequence Y transmitted through transmission channel 103 lie in the diffusion and confusion endorsed by experts, institutions or organizations that the used encryption algorithm introduces regardless of the encryption key being used. Nevertheless, the particular ciphertext sequences Y resulting from their application do not present characteristics such that it was computationally feasible to measure objectively the diffusion and confusion of values making up the ciphertext sequence Y. With this invention, the encrypting device gives as output, as a result of its application, such a substantially randomized ciphertext that allows to measure objectively the diffusion and confusion of values present in the particular randomized-encrypted text sequence Ys resulting from the randomization-encryption of a particular plaintext sequence X with a particular selected control block Ks. This allows the differentiation of the diffusion and confusion generated by different control blocks Kp in the candidate randomized-encrypted text sequence Yp. Consequently, this allows the election of the sequence which provides more subjective security in terms of resistance of the randomized-encrypted text sequence Ys in front of enemy cryptanalysts.

Figure 6:
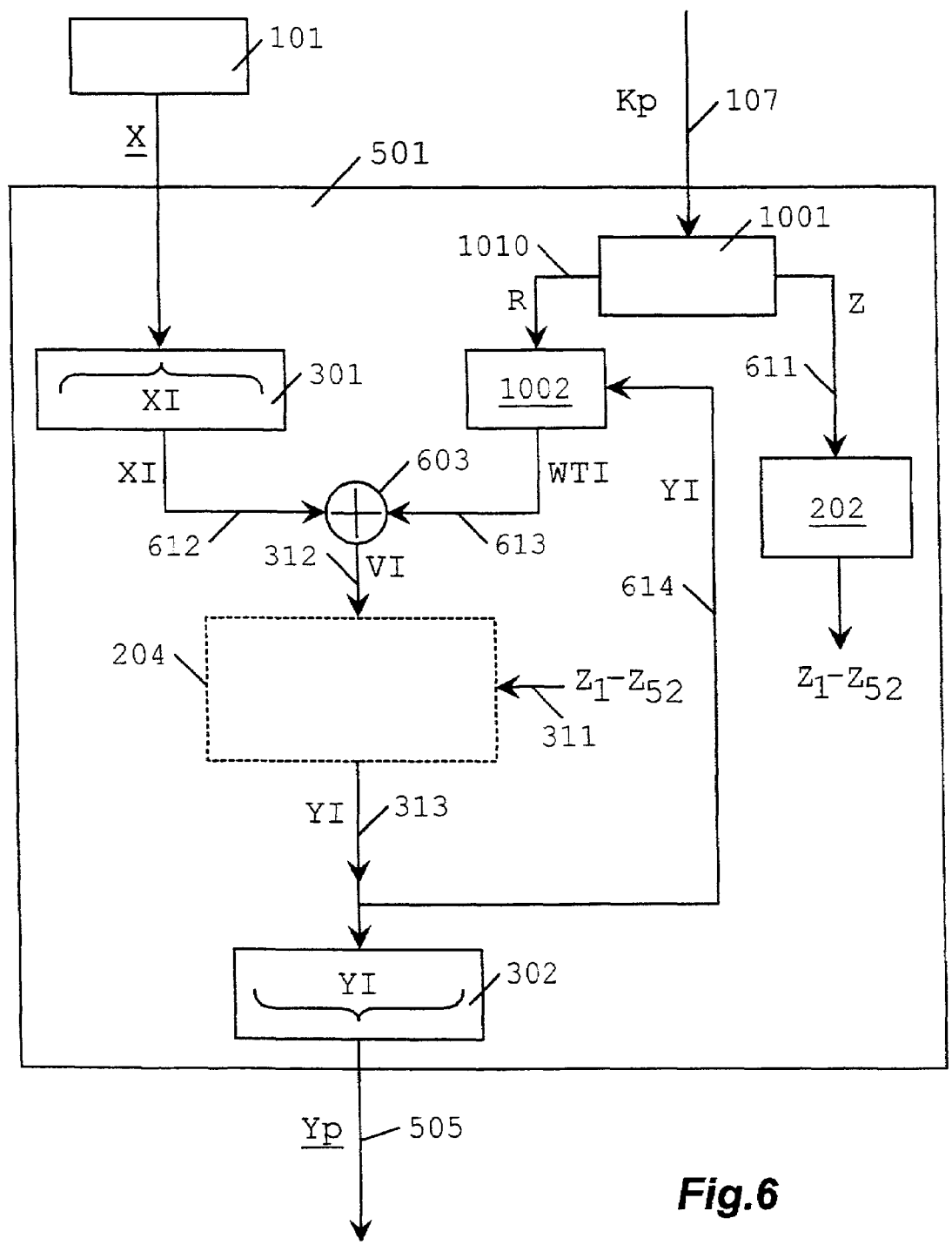
FIG. 6 shows randomizing-encrypting device for the randomization-encryption of a plaintext message according to this invention. Together with FIG. 7 it shows the best implementation of this invention.

FIG. 6 shows possible diagram of randomizing-encrypting device for the randomization-encryption of a plaintext according to this invention. In FIG. 6, parts corresponding to parts shown in FIG. 1, FIG. 3 and FIG. 5 are designated by same references.

The control block divider 1001 receives the control block Kp through channel 107 and divides the control block Kp into two control initial blocks: control initial block Z preferably of length L1=128 bits, and control initial block R preferably of length L2=G bits. The control initial block Z is supplied through output 611 to the generator of encryption control subblocks 202, which generates the encryption control subblocks $Z_1$ to $Z_{52}$ which are supplied to encrypting-decrypting device 204 through input 311. The control initial block R is supplied to transformer block generator 1002 through output 1010.

The plaintext sequence X to be randomized-encrypted arrives continuously from the message source 101 to the input assembly device of block of length N 301, which assembles plaintext blocks XI, preferably of length N=64 bits, of the plaintext sequence X being supplied to the grouping device 603 through output 612. The grouping device 603 presents inputs 612 and 613 and output 312 of 64 parallel lines each one. The grouping device 603 groups the corresponding plaintext block XI and the corresponding transformer block WTI, both of length N=64 bits, which arrive through inputs 612 and 603 respectively, generating the corresponding grouped interblock VI of length N=64 bits through output 312. The grouping operation performed in the grouping device 603 is the bitwise exclusive-OR or XOR, such that XI⊕WTI→VI.

This grouped interblock VI reaches through input 312 the encrypting-decrypting device 204 where it is grouped together with the fiftytwo encryption control subblocks $Z_1$–$Z_{52}$ which arrive through input 311, resulting in a randomized-encrypted text block YI of length N=64 bits through output 313. Output 313, consisting of 64 parallel lines, is connected to the output unit of block of length N 302 and through input 614, which has as a possible implementation being a derivation of output 313, to the transformer block generator 1002. The randomized-encrypted text block YI reaches output unit of block of length N 302 and is supplied to the transformer block generator 1002 in order to be used in the generation of the corresponding transformer block WTI by transformer block generator 1002. This corresponding transformer block WTI will be used in the randomization-encryption of the next plaintext block XI assembled in the input assembly device of block of length N 301. This randomized-encrypted text block YI can be converted into an output unit of block of length N 302 so that it can be transmitted through transmission line 505. The randomized-encrypted text blocks YI make up the candidate randomized-encrypted text sequence Yp.

Figure 7:
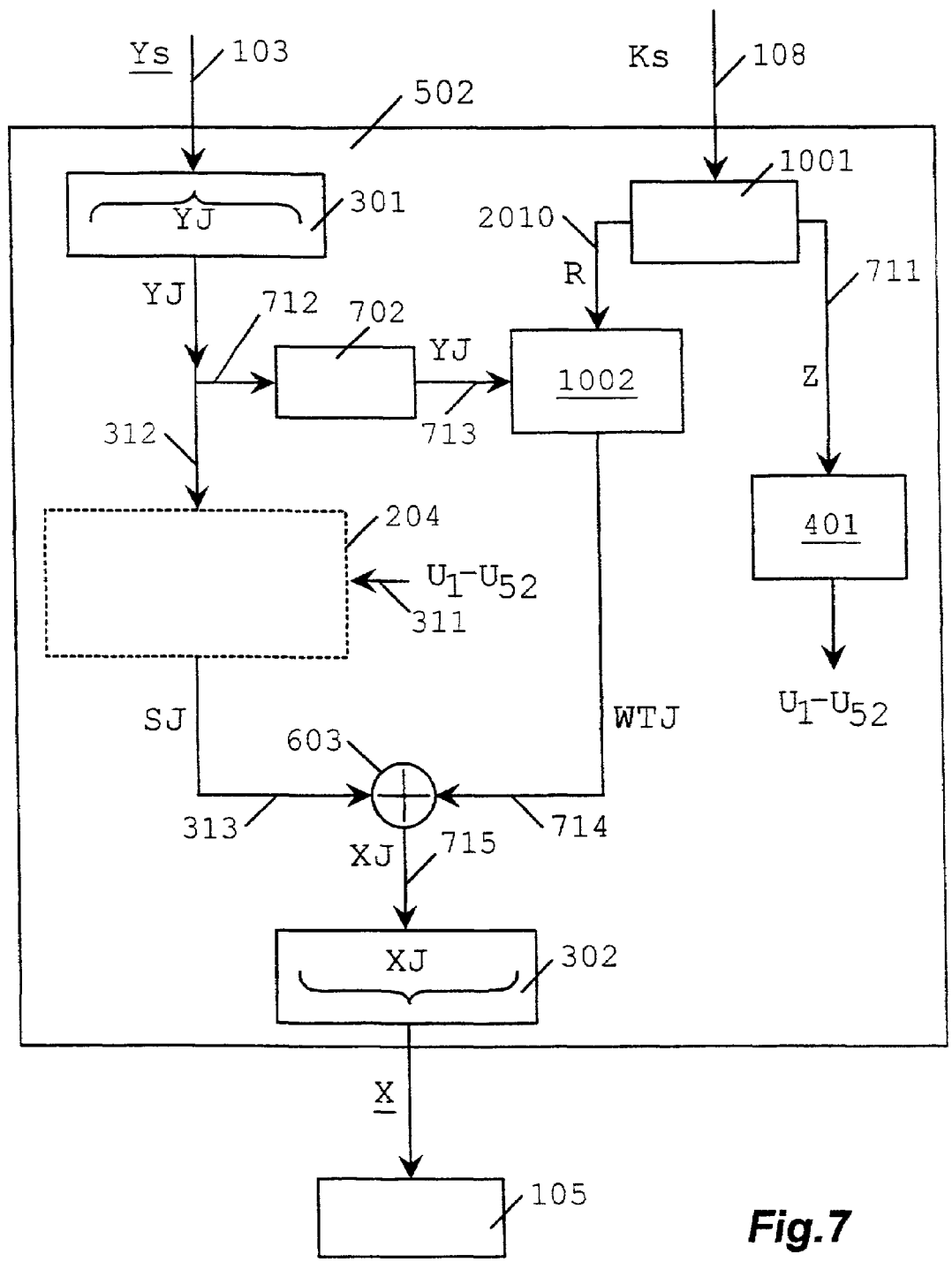
FIG. 7 shows decrypting device for the decryption of randomized-encrypted sequences by making use of device of FIG. 6.
Figure 8:
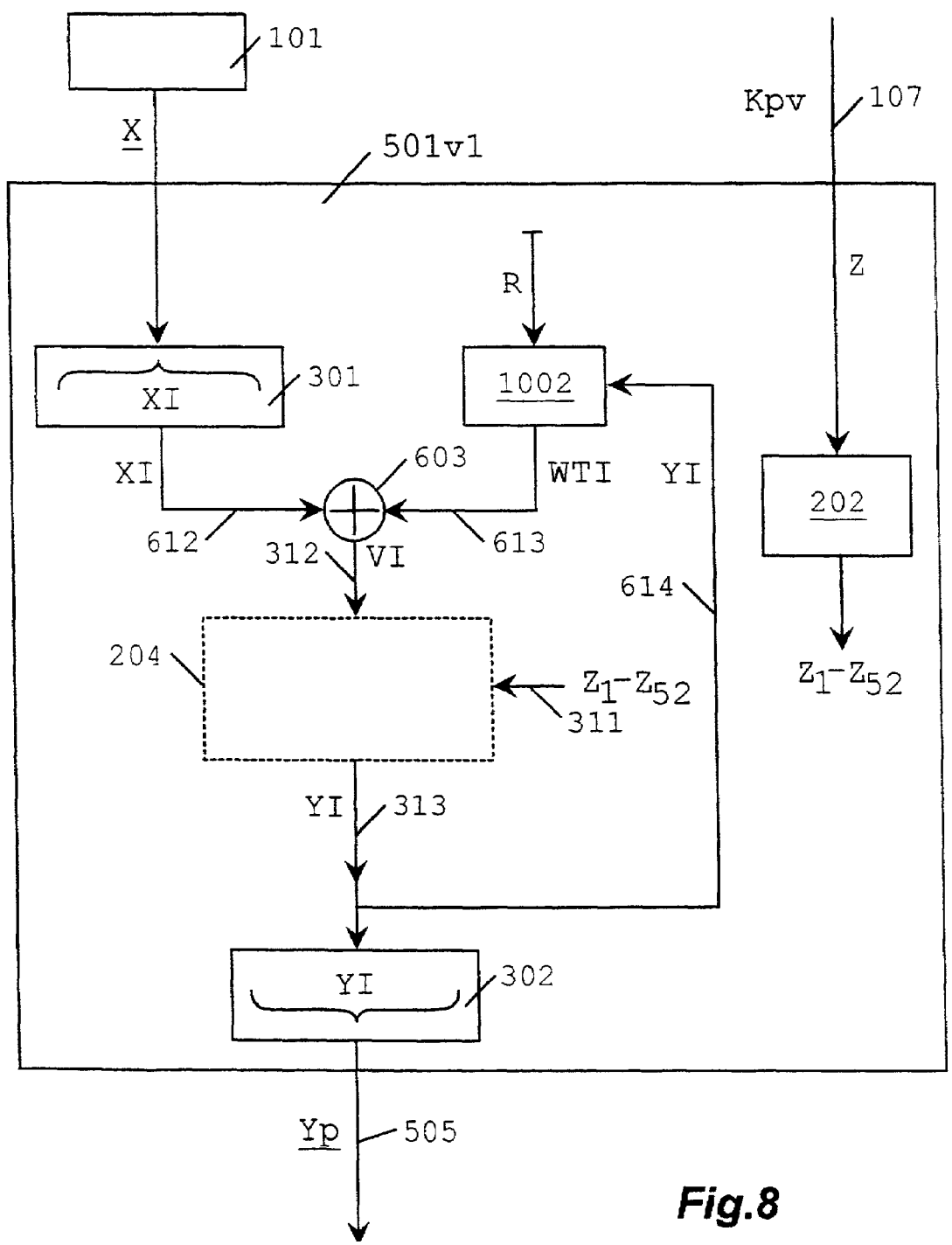
FIG. 8 shows the second implementation of randomizing-encrypting device with variations applied according to the device of FIG. 6.
Figure 10:
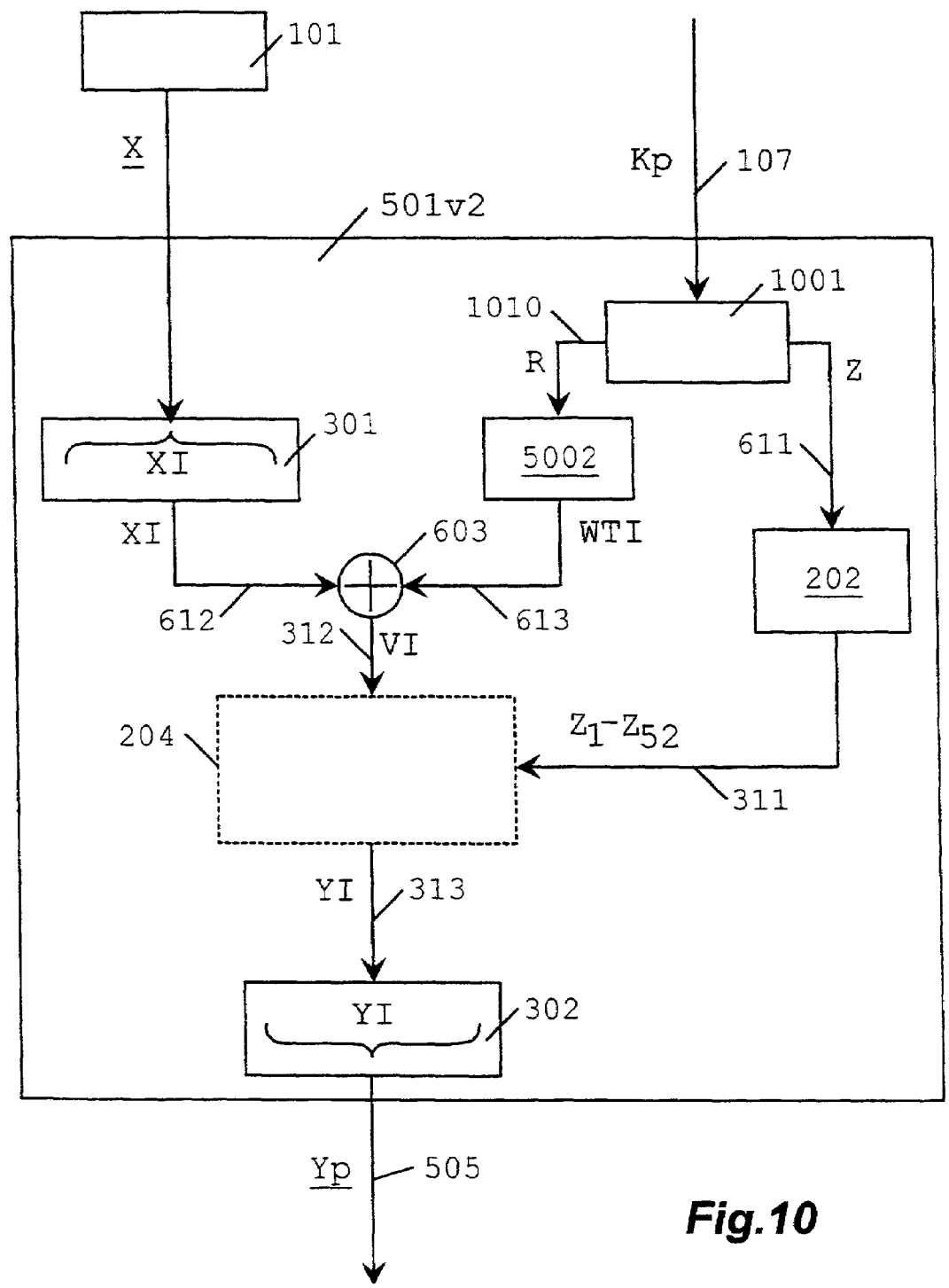
FIG. 10 shows the third implementation of randomizing-encrypting device with variations applied according to the device of FIG. 6.
Figure 11:
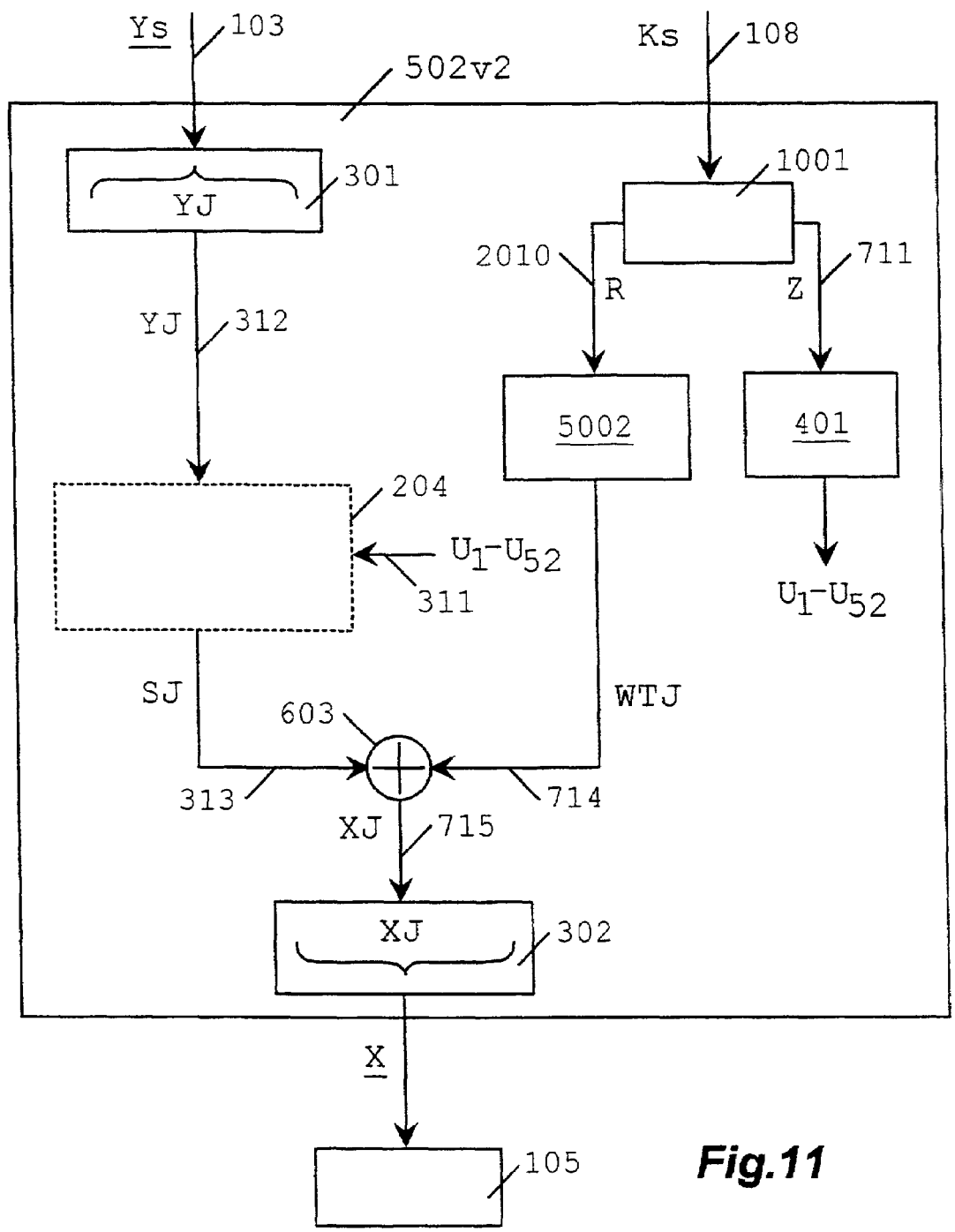
FIG. 11 shows decrypting device for the decryption of randomized-encrypted sequences by making use of device of FIG. 10.
Figure 12:
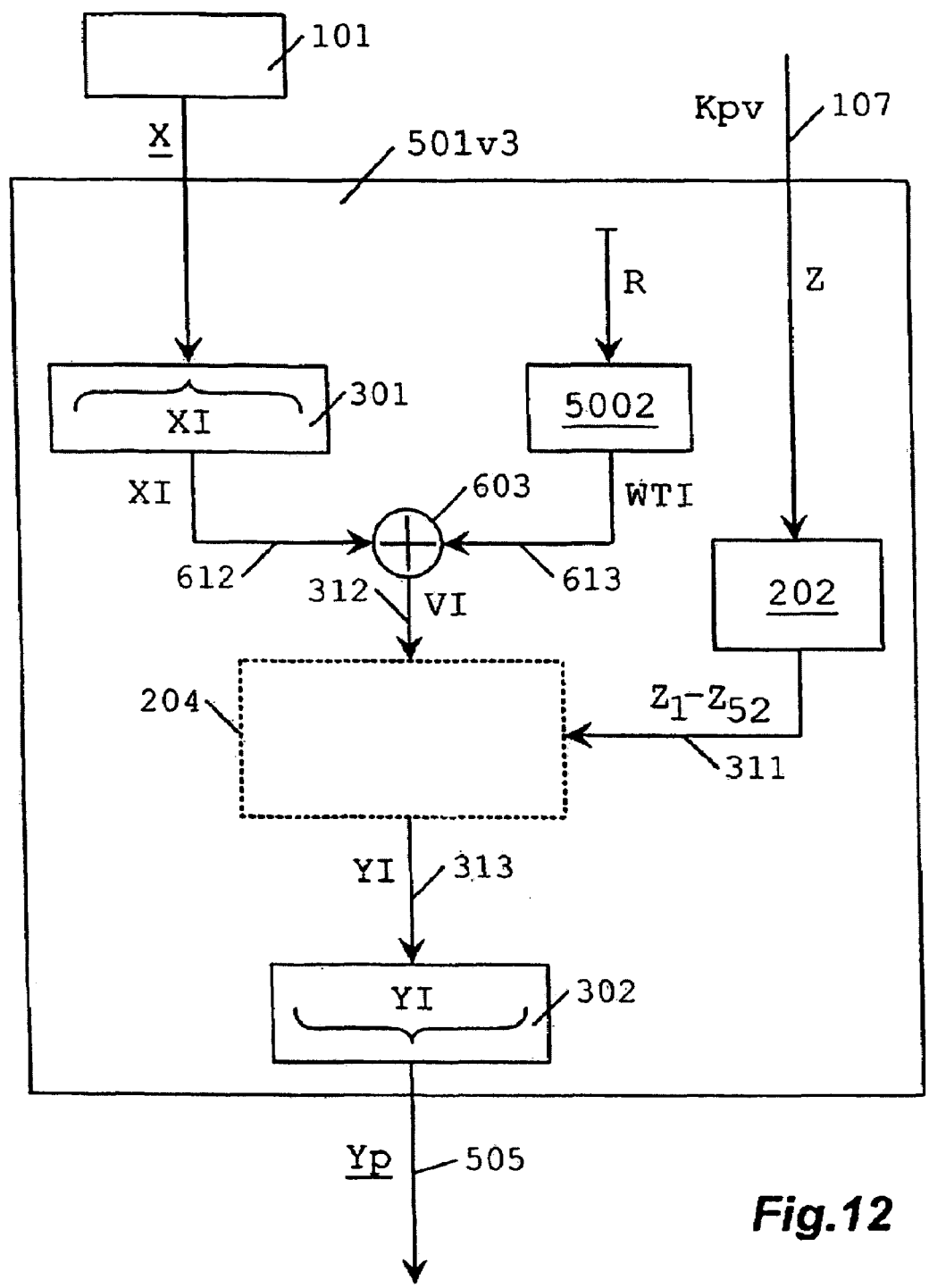
FIG. 12 shows the fourth implementation of randomizing-encrypting device with variations applied according to the device of FIG. 10.

The purpose of the transformer block generator 1002, as well as respective transformer block generators in FIG. 8, FIG. 10 and FIG. 12, is to supply the corresponding transformer block WTI to the grouping device 603 through input 613. The transformer block generator 1002 implements function F such that generates the transformer block WTI from the control initial block R and the randomized-encrypted text block YI resulting from the randomization-encryption of the previous plaintext block XI. The transformer block WTI takes the values shown in TABLE 1 for the different and successive assembled plaintext blocks XI of the plaintext sequence X. The randomized-encrypted text block $YI_1$ is the result of the randomization-encryption of the first plaintext block $XI_1$, the randomized-encrypted text block $YI_2$ is the result of the randomization-encryption of the second plaintext block $XI_2$, and so on. This sequence of blocks of length N according to the particular text sequence is also used in the description of the elements of FIG. 7, FIG. 10 and FIG. 11.

TABLE 1

POSSIBLE VALUES FOR WTI

| Plaintext block order | Plaintext block | Value of WTI |
|---|---|---|
| First | $XI_1$ | F(R) |
| Second | $XI_2$ | $F(YI_1)$ |
| Third | $XI_3$ | $F(YI_2)$ |
| . . . | . . . | . . . |
| N | $XI_n$ | $F(YI_{n-1})$ |

The function F implemented in the transformer block generator 1002 could be defined amongst multiple ways as:
$WTI_1 = F(R) = H_1(R)$, for the first transformer block WTI,
$WTI_n = F(YI_{n-1}) = H_n(R, YI_{n-1})$, for the "nth" transformer block WTI generated for the randomization-encryption of the "nth" plaintext block XI.

Where:
$WTI_1 = H_1(R)$ could be:
WTI=R, the identity, or
WTI resulting from some calculations on R, for instance, and $WTI_n = H_n(R, YI_{n-1})$ amongst many possible implementations:

It could be $H_n(R, YI_{n-1}) = YI_{n-1}$, the previous randomized-encrypted text block YI, which, despite generating a random randomized-encrypted sequence Yp, presents the disadvantage with respect to other implementations that the transformer block WTI is known, making the cryptanalytic attacks that could be performed easier.

It could be $H_n(R, YI_{n-1}) = E_n(R)$ oper_$1YI_{n-1}$:

Where oper_1 can be the XOR or exclusive-OR operation.

And $E_n(R)$ could be chosen for implementing one of the functions shown below, provided as some of the possible implementations without limiting them:

$E_n(R) = (E_{n-1}(R)+1) \mod 2^{64}$, or $E_n(R) = (E_{n-1}(R)-1) \mod 2^{64}$.

Dividing the control initial block R into two subblocks R1 and R2 of length 32 bits each one, it can be implemented as $E_n(Ri) = (E_{n-1}(Ri)+1) \mod 2^{32}$, or $E_n(Ri) = (E_{n-1}(Ri)-1) \mod 2^{32}$, for i=1,2.

In general, dividing the control initial block R into Q subblocks, where Q is a divisor of 64. Control initial block R is divided into R1, ..., RQ with length 64/Q bits each one. $E_n(R)$ can be implemented as $E_n(Ri) = (E_{n-1}(Ri)$ oper_$2B) \mod 2^{64/Q}$ for i=1, ..., Q, wherein B is a value, and oper_2 can be addition or subtraction for instance, without limiting other possible operations.

Or another general implementation, dividing the control initial block R into different subblocks R1, ..., RD, such that Ri has length Qi bits, wherein Qi is less than or equal to 64. Then, $E_n(Ri) = (E_{n-1}(Ri)$oper_$3B) \mod 2^{Qi}$, for i=1, ..., D, wherein B is a value, and oper_3 can be addition or subtraction for instance, without limiting other possible operations.

Being defined previous function "mod" as the "modulus" operation as known in the art, such that "a=b mod c" where "a" is the remainder of the integer division of "b" by c In the specific implementations previously shown, the control initial block R is preferably of length G=64 bits and the control block Kp is preferably of length 192 bits.

$E_n(R)$ be an adaptation of random number generator, as the one appearing originally in "Toward a Universal Random Number Generator", authored by George Marsaglia and Arif Zaman, Florida State University of U.S.A., Report:FSU-SCRI-87-50 (1987), which starting from the control initial block R which is supplied as what the experts in the art identify as "seed", can be used for the generation of 64 bit blocks of random data to be used as function $E_n$. In this particular case of random number generator that makes use of a "seed" length=32 bits, the control initial block R has preferably a length of G=32 bits and the control block Kp has 160 bits.

$E_n(R)$ make use of hash function MD5, described in "Request for Comments:1321" or "rfc1321", authored by R. Rivest, of the MIT Laboratory for Computer Science and RSA Data Security, Inc., U.S.A., dated from April 1992 which, starting from the control initial block R that it is supplied as initial data, can be used for generating 64 bit blocks to be used as function $E_n$, so that $E_n(R)$ 64 bits selected from $MD5_n(R)$ and $MD5_n(R) = MD5(MD5_{n-1}(R))$ for instance. Due to the characteristics of hash functions, the control initial block R can be of any length G, and the control block Kp has preferably 128+G bits.

$E_n(R)$ make use of hash function SHA1, object of the Federal Information Processing Standards Publication 180-1 (FIPS PUB 180-1) dated from Apr. 17, 1995, which announces the "Secure Hash Standard" by the "National Institute of Standards and Technology" ("NIST") of the Commerce Department of the United States Government, which, starting from the control initial block R that it is supplied as initial data, can be used for generating 64 bit blocks to be used as function $E_n$, so that $E_n(R)$=64 bits selected from $SHA1_n(R)$ and $SHA1_n(R) = SHA1(SHA1_{n-1}(R))$ for instance. The control initial block R can be of any length G, and the control block Kp has preferably 128+G bits.

Other possible implementations of $E_n(R)$.

It could be $H_n(R, YI_{n-1}) = R$ oper_$4E'_n(YI_{n-1})$:

Where oper_4 can also be the XOR or exclusive-OR operation.

And $E'_n(YI_{n-1})$ could be, among the following and without limiting other possible operations:

$E'_n(YI_{n-1}) = (YI_{n-1}+1) \mod 2^{64}$, or $E'_n(YI_{n-1}) = (YI_{n-1}-1) \mod 2^{64}$.

Dividing block $YI_{n-1}$ into two subblocks $YI_{n-1}1$ and $YI_{n-1}2$ of length 32 bits each one, it can be implemented as $E'_n(YI_{n-1}i) = (YI_{n-1}i+1) \mod 2^{32}$, or $E'_n(YI_{n-1}i) = (YI_{n-1}i-1) \mod 2^{32}$, for i=1,2.

In general, dividing the block $YI_{n-1}$ into Q subblocks, being Q a divisor of 64, $YI_{n-1}1$, ..., $YI_{n-1}Q$ of length 64/Q bits each one, it can be implemented as $E'_n(YI_{n-1}i) = (YI_{n-1}i$ oper_$5B) \mod 2^{64/Q}$ for i=1, ..., Q, wherein B is a value, and oper_5 can be addition or subtraction for instance, without limiting other possible operations.

Or similarly, another general implementation, dividing the block $YI_{n-1}$ into different subblocks $YI_{n-1}1$, ..., $YI_{n-1}D$, such that $YI_{n-1}i$ has length Qi bits, being Qi less than or equal to 64. Then, $E'_n(YI_{n-1}i) = (YI_{n-1}i$ oper_$6B) \mod 2^{Qi}$, for i=1, ..., D, wherein B is a value, and oper_6 can be addition or subtraction for instance, without limiting other possible operations.

Make use of hash function like MD5 or SHA1, already mentioned above, such that $E'_n(YI_{n-1})$=64 bits selected from $MD5(YI_{n-1})$ or 64 bits selected from $SHA1(YI_{n-1})$.

In the specific implementations previously shown, the control initial block R is preferably of length G=64 bits and the control block Kp is preferably of length 192 bits.

Other possible implementations of $E'_n(YI_{n-1})$.

It could also be implemented as $H_n(R, YI_{n-1}) = YI_{n-1}$ oper_$7H_{n-1}(R, YI_{n-2})$ where for instance:

oper_7 can also be the XOR or exclusive-OR operation.

and $H_1(R, YI_0) = R$.

In this specific implementation the control initial block R is preferably of length G=64 bits and the control block Kp is preferably of length 192 bits.

Other possible implementations of $WTI_n=F(YI_{n-1})=H_n(R, YI_{n-1})$.

Obviously, there are and will be specific implementations of the function F, implemented in the transformer block generator 1002, as well as with the possible functions implemented by the transformer block autonomous generator 5002, which have a higher probability than other functions F that the randomizing-encrypting device produces a randomized-encrypted text fulfilling the randomness tests implemented in the randomness analyzer 503 of FIG. 5 according to the plaintext sequence X that is to be randomized-encrypted with a control block Kp.

The length of control block Kp can preferably be the sum of the length of the control initial block Z, preferably of 128 bits, and the length of the control initial block R, which will preferably have the length of the initial block of the particular implementation of the transformer block generator 1002. There is more security in the confidentiality of the randomized-encrypted information, since the larger the length of the control block Kp is, the larger the increment in cost of brute force attacks that can be done is. The length of the selected control block Ks consists of a sequence larger than 128 bits and, although it is currently accepted that 128 bits are enough in front of enemy attacks, the larger the length in bits of the key used by the encrypting device is, the more secure the inviolability of the encrypted text whose protection is desired is.

The operation of verification of the randomness of the candidate randomized-encrypted text sequence Yp is computationally feasible for said qualities that the candidate randomized-encrypted text sequence Yp presents as a result of the encryption with this invention, qualities substantially characteristic of random sequences. Consequently, the device of this invention presents the new possibility of allowing the objective measure of the diffusion and confusion of values that the particular candidate randomized-encrypted text sequence Yp presents by laypersons in this art; as well as the differentiation amongst different, and whichever blocks used and whichever possible control block Kp used, which provide a larger diffusion and confusion of values.

Moreover, the randomizing-encrypting device in any of its variations is also a random number generator. Supplying different input data as plaintext sequence X, text Yp making up a random sequence results as output. This means that the randomizing-encrypting device according to the invention can also be used as a random number generator.

Due to the diffusion and confusion of the resultant randomized-encrypted text, together with the influence that a change in a bit in the plaintext sequence X entails in all following output bits, the randomizing-encrypting device 501, as well as its variation 501v1, can also be used as "hash function" or "one-way encryption" as it is known by those with knowledge in the encryption art.

FIG. 7 shows possible diagram of decrypting device for the decryption of randomized-encrypted text sequence generated with randomizing-encrypting device in FIG. 6. In FIG. 7, parts corresponding to parts shown in FIG. 1, FIG. 4, FIG. 5 and FIG. 6 are designated by same references.

The selected control block Ks arrives to the control block divider 1001 through secure channel 108, being divided into control initial block Z and control initial block R. The control block divider 1001 divides the selected control block Ks in the same way as the control block divider 1001 of FIG. 6 does, with which the randomized-encrypted text sequence Ys being decrypted was randomized-encrypted. The control initial block Z is supplied through output 711 to the generator of decryption control subblocks 401, which generates the fiftytwo decryption control subblocks $U_1$–$U_{52}$ which are supplied through input 311 to the encrypting-decrypting device 204. The control initial block R is supplied to the transformer block generator 1002 through output 2010.

Figure 9:
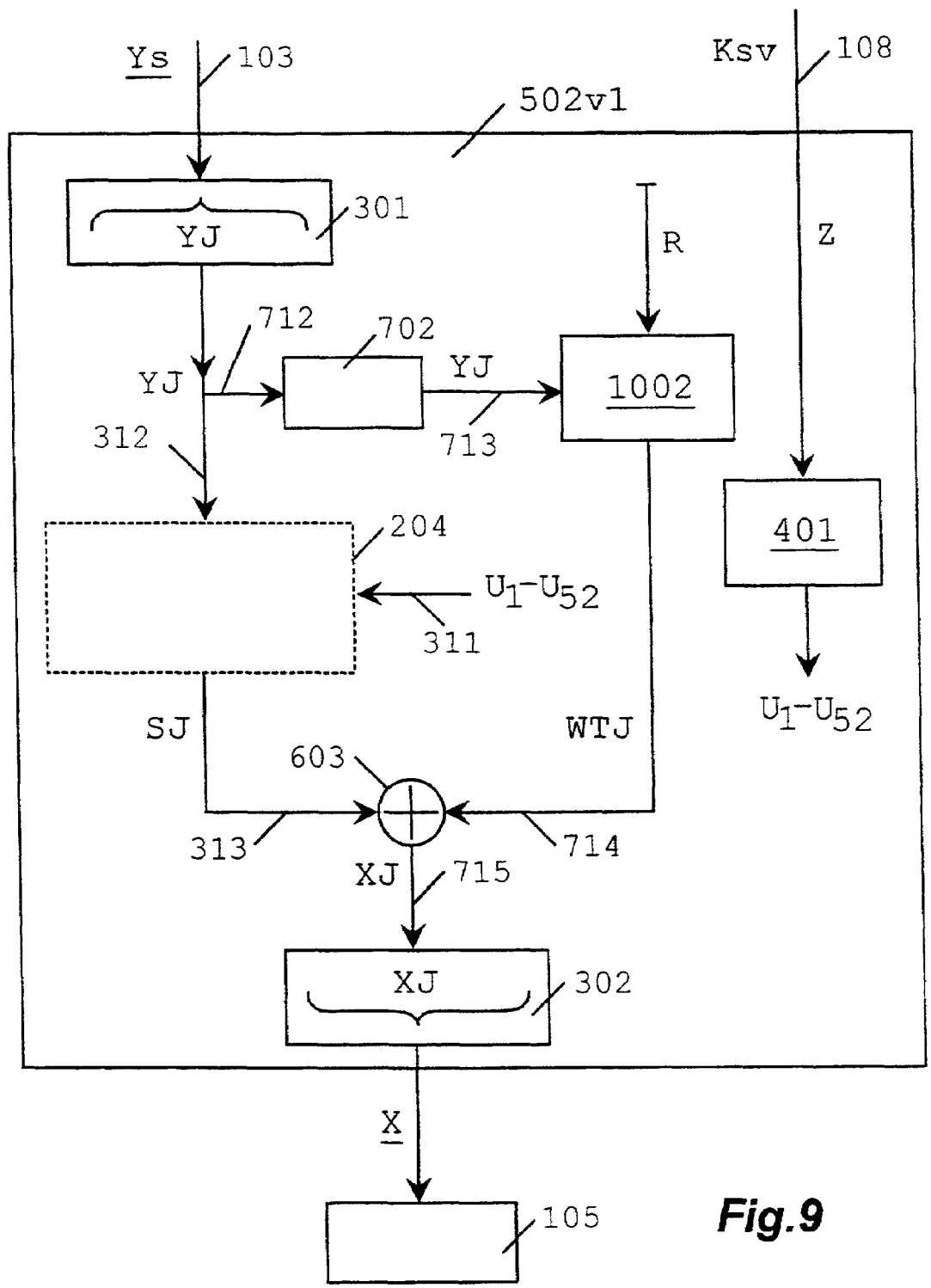
FIG. 9 shows decrypting device for the decryption of randomized-encrypted text sequences by making use of device of FIG. 8.
Figure 13:
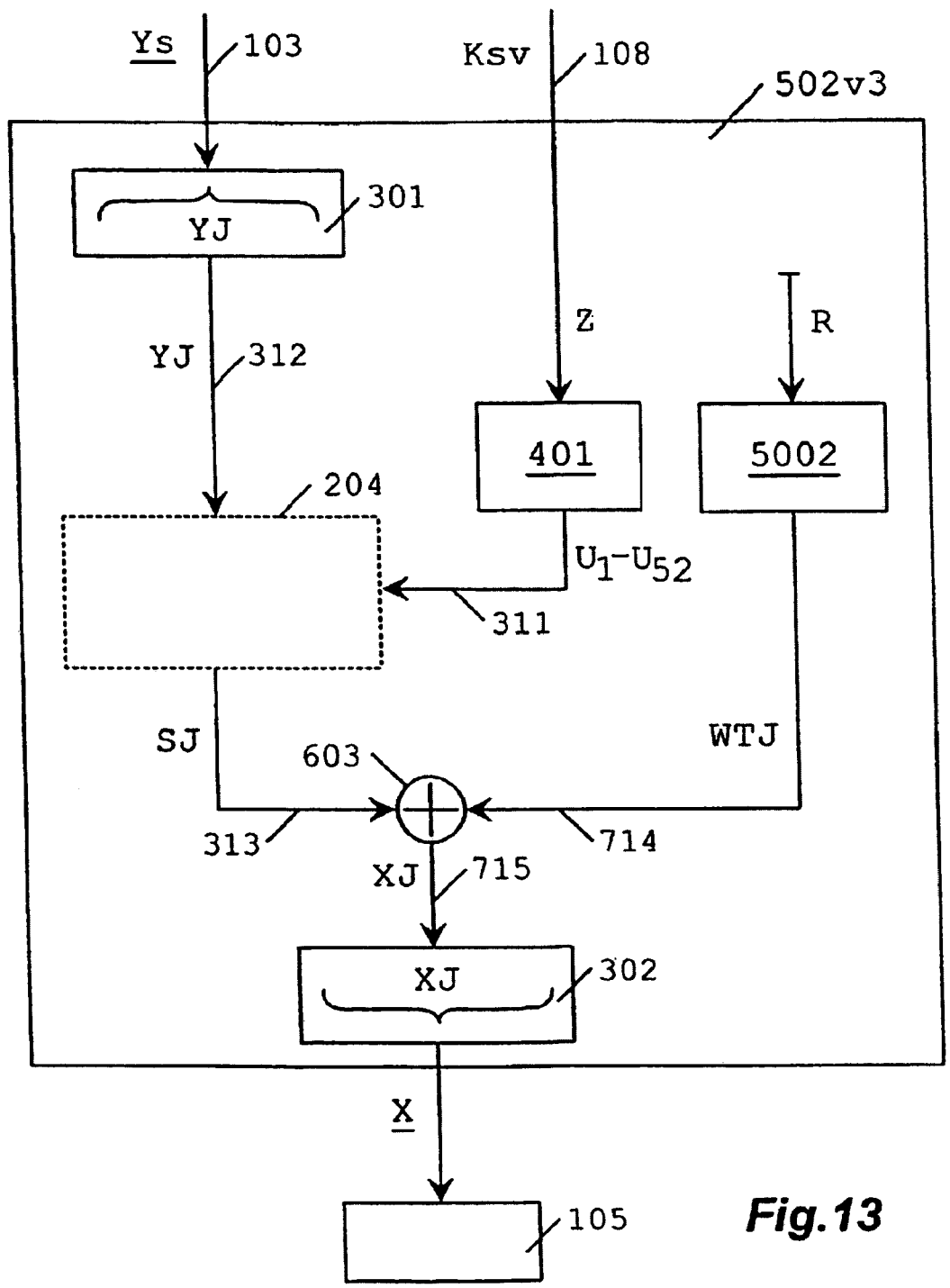
FIG. 13 shows decrypting device for the decryption of randomized-encrypted sequences by making use of device of FIG. 12.

The transformer block generator 1002 presents inputs 2010 and 713, and output 714, being the purpose of the transformer block generator 1002, shown in FIG. 7 and in FIG. 9 as well as the transformer block autonomous generator 5002 in FIG. 11 and FIG. 13, that of supplying the transformer block WTJ of length N=64 bits given as input to the grouping device 603 through input 714.

The transformer block generator 1002 implements function F which will generate transformer block WTJ equal to the function F implemented in the transformer block generator 1002 of the device of FIG. 6 with which the randomized-encrypted text sequence Ys object of the decryption was generated.

TABLE 2 shows the different values that transformer block WTJ takes for the different and successive decrypted randomized-encrypted text blocks YJ.

TABLE 2

POSSIBLE VALUES FOR WTJ

| Randomized-encrypted text block order | Randomized-encrypted text block | Value of WTJ |
|---|---|---|
| First | $YJ_1$ | $F(R)$ |
| Second | $YJ_2$ | $F(YJ_1)$ |
| Third | $YJ_3$ | $F(YJ_2)$ |
| ... | ... | ... |
| N | $YJ_n$ | $F(YJ_{n-1})$ |

The randomized-encrypted text sequence Ys arrives continuously through transmission channel 103 to the input assembly device of block of length N 301, which assembles randomized-encrypted text blocks YJ of length preferably N=64 bits of the randomized-encrypted text sequence Ys. The input assembly device of block of length N 301 connects with the encrypting-decrypting device 204 through output 312, and with the withholding unit 702 through input 712, which can be a derivation of output 312. The randomized-encrypted text block YJ is supplied to the encrypting-decrypting device 204 and to the withholding unit 702 through output 312. The purpose of the withholding unit 702 is keeping a copy of the current randomized-encrypted text block YJ which is supplied as input to the encrypting-decrypting device 204 for the subsequent usage by the transformer block generator 1002.

The randomized-encrypted text block YJ reaches the encrypting-decrypting device 204 where it is grouped together with the fiftytwo decryption control subblocks $U_1$–$U_{52}$, resulting in decrypted interblock SJ of length N=64 bits through output 313. The grouping device 603 has inputs 313 and 714, and output 715, of 64 parallel lines each one. In the grouping device 603 the corresponding decrypted interblock SJ and the corresponding transformer block WTJ, which arrive through inputs 313 and 714 respectively, group and result in the corresponding plaintext block XJ of length N=64 bits. The grouping operation performed in the grouping device 603 is the one known as bitwise exclusive-OR or XOR so that SJ⊕WTJ→XJ.

This plaintext block XJ is supplied through output 715 to the output unit of block of length N 302. Once the plaintext block XJ is obtained, the current randomized-encrypted text block YJ that is kept in withholding unit 702 is supplied through input 713 to the transformer block generator 1002 so that in the decryption of the following assembled randomized-encrypted text block YJ, the transformer block generator 1002 generates the corresponding transformer block WTJ that has to be used. The elimination of the withholding unit 702, as well as the one in the decrypting device in FIG. 9, is possible if the transformer block generator 1002 is implemented in such a way that it can receive the current randomized-encrypted text block YJ and use it in the generation of the corresponding transformer block WTJ which will be used in the decryption of the following randomized-encrypted text block YJ. This would also entail, for instance, the elimination of input/output 713 and, therefore, input 712 would be the input to the transformer block generator 1002. Since it can be considered that it clarifies the explanation of the operation, the withholding unit 702 and input/output 713 are kept in FIG. 7 and FIG. 9.

The plaintext block XJ is converted in an output unit of block of length N 302 and it can be transmitted to a target unit 105. The succession of plaintext blocks XJ results in the plaintext sequence $\underline{X}$.

According to the invention FIG. 8 shows possible diagram of first variation of randomizing-encrypting device of plaintext sequence. In FIG. 8, parts corresponding to parts shown in FIG. 1, FIG. 3, FIG. 5 and FIG. 6 are designated by same references.

This variation of randomizing-encrypting device 501$v$1 is characterized by having as control block Kp the variation of control block Kpv consisting of the control initial block Z. The variation of control block Kpv arrives through channel 107, reaching the generator of encryption control subblocks 202, which generates the encryption control subblocks $Z_1$–$Z_{52}$ supplied through input 311 of the encrypting-decrypting device 204. The control initial block R of length preferably L2=G bits is in this implementation fixed for the randomization-encryption of a plaintext sequence $\underline{X}$, and it does not depend on the variation of control block Kpv.

For the generation of the transformer block WTI the transformer block generator 1002 implements function F which makes use of the beforehand fixed control initial block R and the randomized-encrypted text block YI resulting from the randomization-encryption of the previous plaintext block XI as well as the transformer block generator 1002 of FIG. 6 does. The function F implemented by the transformer block generator 1002 can be identical to any of the functions F previously presented in the description of FIG. 6. The difference with the randomizing-encrypting device of FIG. 6 lies in the beforehand fixed control initial block R: in the randomizing-encrypting device of FIG. 6 it is supplied by the control block divider 1001, element that this implementation lacks.

Although in this variation of randomizing-encrypting device 501$v$1, as well as the variation of randomizing-encrypting device 501$v$3 of FIG. 12, the variation of control block Kpv consists preferably of a 128 bit sequence, and it is therefore "weaker" in front of enemy attacks like a "brute force" attack than the control block Kp used in the randomizing-encrypting device 501 of FIG. 6 or its variation 501$v$2 of FIG. 10, it is accepted that, for the time being, a key of 128 bits of length presents enough security.

A complete description of the operation of this device is not done here since it can be considered that the similarity with the description offered in the method of implementation of the randomizing-encrypting device of FIG. 6 and the one of FIG. 8, which maintain common references, allows easily understanding of which is the method of implementation of this device.

FIG. 9 shows possible diagram of variation of decrypting device for the decryption of randomized-encrypted text sequence generated with the variation of randomizing-encrypting device of FIG. 8. In FIG. 9, parts corresponding to common parts of FIG. 1, FIG. 4, FIG. 5, FIG. 7 and FIG. 8 are designated by same references.

The selected control block Ks in this variation of decrypting device 502$v$1 is the variation of selected control block Ksv consisting of the control initial block Z. The variation of selected control block Ksv arrives through secure channel 108 and is supplied to the generator of decryption control subblocks 401 which generates the decryption control subblocks $U_1$–$U_{52}$ that are supplied through input 311 to the encrypting-decrypting device 204.

The control initial block R of length preferably L2=G bits in this implementation is fixed beforehand for the decryption of the randomized-encrypted text sequence $\underline{Ys}$; it does not depend on the variation of selected control block Ksv supplied to the device through secure channel 108. The transformer block generator 1002 implements function F, so that it generates the transformer blocks WTJ from the beforehand fixed control initial block R and the previously decrypted randomized-encrypted text block YJ. The control initial block R and the specific function F that the transformer block generator 1002 implements are respectively equal to the control initial block R and function F implemented in the transformer block generator 1002 of the randomizing-encrypting device of FIG. 8 with which the randomized-encrypted text sequence Ys object of the current decryption was randomized-encrypted.

The complete description of the variation of decrypting device 502$v$1 is not done since it can be considered that the similarity with the description offered for the implementation of the decrypting device of FIG. 7 and the one of FIG. 9, together with the common references, allows the understanding of the implementation of this variation.

FIG. 10 shows possible diagram of third variation of decrypting device in FIG. 5. In FIG. 10, parts corresponding to parts of FIG. 1, FIG. 3, FIG. 5 and FIG. 6 are designated by same references.

Compared to FIG. 6 this variation of randomizing-encrypting device 501$v$2 differs on the replacement of the transformer block generator 1002 by the transformer block autonomous generator 5002 and additional elimination of connection 614.

The control block divider 1001 presents input 107 and outputs 611 and 1010. The control block divider 1001 receives the control block Kp through channel 107 dividing it into control initial block Z, preferably of length L1=128 bits, and control initial block R, preferably of =length L2=G bits. The control initial block Z is supplied to the generator of encryption control subblocks 202 through output 611. The control initial block R is supplied to the transformer block autonomous generator 5002 through output 1010.

The transformer block autonomous generator 5002 implements function F', so that the transformer block WTI takes the following values shown in TABLE 3 for the different and successive assembled plaintext blocks XI of a plaintext sequence $\underline{X}$ that is randomized-encrypted.

TABLE 3

VALUES TAKEN BY WTI

| Plaintext block order | Plaintext block | Value of WTI |
|---|---|---|
| First | $XI_1$ | $F'_1(R)$ |
| Second | $XI_2$ | $F'_2(R)$ |
| Third | $XI_3$ | $F'_3(R)$ |
| ... | ... | ... |
| N | $XI_n$ | $F'_n(R)$ |

The function F' implemented in the transformer block autonomous generator 5002 could be defined amongst multiple ways as:

$WTI_1 = F'_1(R)$, for the first transformer block WTI, $WTI_n = F'_n(R)$, for the "nth" transformer block WTI generated for the randomization-encryption of the "nth" plaintext block XI.

Where:

$WTI_1 = F'_1(R)$ could be:

WTI=R, the identity, or

WTI resulting from some calculations on R, for instance, and $WTI_n = F'_n(R)$ could be, amongst many possible implementations, and without limiting them:

$F'_n(R) = (F'_{n-1}(R)+1) \mod 2^{64}$, or $F'_n(R) = (F'_{n-1}(R)-1) \mod 2^{64}$.

Dividing the control initial block R into two subblocks R1 and R2 of length 32 bits each one, it can be implemented as $F'_n(Ri) = (F'_{n-1}(Ri)+1) \mod 2^{32}$, or $F'_n(Ri) = (F'_{n-1}(Ri)-1) \mod 2^{32}$, for i=1,2.

In general, dividing the control initial block R into Q subblocks where Q is a divisor of 64, and R is divided into R1, ..., RQ with length 64/Q bits each one.

$F'_n(R)$ can be implemented as $F'^n(Ri) = (F'_{n-1}(Ri)\text{oper\_}8B) \mod 2^{64/Q}$ for i=1, ..., Q, wherein B is a value, and oper_8 can be addition or subtraction for instance, without limiting other possible operations.

Another general implementation, dividing block R into different subblocks R1, RD, such that Ri has length Qi bits, being Qi less than or equal to 64. Then, $F'_n(Ri) = (F'_{n-1}(Ri)\text{oper\_}9B) \mod 2^{Qi}$, for i=1, ..., D, wherein B is a value, and oper_9 can be addition or subtraction for instance, without limiting other possible operations.

In these previously shown specific implementations the control initial block R is preferably of length G=64 bits and the control block Kp is preferably of length 192 bits.

$F'_n(R)$ make use of an adaptation of random number generator, as the one mentioned above, appearing originally in "Toward a Universal Random Number Generator", authored by George Marsaglia and Arif Zaman, which starting from the control initial block R which is supplied as what the experts in the art identify as "seed", can be used for the generation of 64 bit random data blocks to be used as function F'. In this case, the control initial block R has preferably a length of G=32 bits and the control block Kp has 160 bits.

$F'_n(R)$ make use of hash function MD5 or SHA1, for instance, which, starting from the control initial block R that it is supplied as initial data, can be used for generating 64 bit blocks, such that $F'_n(R) = 64$ bits selected from $MD5_n(R)$ and $MD5_n(R) = MD5(MD5_{n-1}(R))$, or $F'_n(R) = 64$ bits selected from $SHA1_n(R)$ and $SHA1_n(R) = SHA1(SHA1_{n-1}(R))$ for instance. Due to the characteristics of hash functions, the control initial block R can be preferably of any length G, and the control block Kp has 128+G bits in this case.

Other possible implementations.

The transformer block autonomous generator 5002 generates the corresponding transformer blocks WTI from the control initial block R, without making use of the feedback with randomized-encrypted text blocks YI which are given through output 313 of the encrypting-decrypting device 204.

The length of control block Kp can preferably be the sum of the length of the control initial block Z, preferably of 128 bits, and the length of the control initial block R, which will depend on the specific implementation of the transformer block autonomous generator 5002. There is more security in the confidentiality of the randomized-encrypted information, since the larger the length of the control block Kp is, the larger the increment in cost of brute force attacks that can be done is.

A complete description of the operation of this randomizing-encrypting device is not done here since it can be considered that the similarity with the description offered in the method of implementation of the randomizing-encrypting device of FIG. 6 and the one of FIG. 10, together with common references, allows easily understanding of which is the method of implementation of this device.

FIG. 11 shows possible diagram of variation of decrypting device for the decryption of randomized-encrypted text sequence generated with the randomizing-encrypting device of FIG. 10. In FIG. 11, parts corresponding to parts of FIG. 1, FIG. 4, FIG. 5, FIG. 7 and FIG. 10 are designated by same references.

Compared to the decrypting device 502 of FIG. 7, this variation of decrypting device 502v2 differs on the replacement of the transformer block generator 1002 by the transformer block autonomous generator 5002, and additional elimination of withholding unit 702 and connections 712 and 713.

The control block divider 1001 presents input 108 and outputs 711 and 2010. The control block divider 1001 receives the selected control block Ks through secure channel 108, dividing it into control initial block Z, and control initial block R. The control block divider 1001 divides the selected control block Ks in the same way as the control block divider 1001 of the device of FIG. 10 divided the selected control block Ks for the randomization-encryption of the randomized-encrypted text sequence Ys which is decrypted. The control initial block Z is supplied to the generator of decryption control subblocks 401 through output 711. The control initial block R is supplied to the transformer block autonomous generator 5002 through output 2010.

The transformer block autonomous generator 5002 implements function F' which is the same as function F' implemented by the transformer block autonomous generator 5002 of FIG. 10 with which the randomized-encrypted text sequence Ys object of the decryption was randomized-encrypted.

TABLE 4 shows the different values that the transformer block WTJ takes for the different and successive decrypted randomized-encrypted text blocks YJ.

TABLE 4

VALUES TAKEN BY WTJ

| Randomized-encrypted text block order | Randomized-encrypted text block | Value of WTJ |
| --- | --- | --- |
| First | $YJ_1$ | $F'_1(R)$ |
| Second | $YJ_2$ | $F'_2(R)$ |
| Third | $YJ_3$ | $F'_3(R)$ |
| ... | ... | ... |
| N | $YJ_n$ | $F'_n(R)$ |

A complete description of the operation of the variation of decrypting device 502v2 is not done here since it can be considered that the similarity with the description offered in the method of implementation of the decrypting device of FIG. 7 and the one of FIG. 11, together with common references, allows understanding of which is the method of implementation of this device.

FIG. 12 shows possible diagram of third variation for the randomizing-encrypting device of plaintext sequence according to the invention. In FIG. 12, parts corresponding to common parts of FIG. 1, FIG. 3, FIG. 5, FIG. 6 and FIG. 10 are designated by same references.

This variation of the randomizing-encrypting device 501v3 is characterized by having as control block Kp the variation of control block Kpv consisting of the control initial block Z. The variation of control block Kpv arrives through channel 107, reaching the generator of encryption control subblocks 202, which generates the encryption control subblocks $Z_1$–$Z_{52}$ supplied through input 311 of the encrypting-decrypting device 204. In this implementation the control initial block R of length preferably L2=G bits is fixed beforehand for the randomization-encryption of a plaintext sequence X, and it does not depend on the variation of control block Kpv.

For the generation of the transformer blocks WTI the transformer block autonomous generator 5002 implements function F' which makes use of the beforehand fixed control initial block R. The function F' implemented by the transformer block autonomous generator 5002 can be any of the functions F' previously presented in the description of FIG. 10. The difference with the randomizing-encrypting device of FIG. 10 lies in the fixed control initial block R in the randomizing-encrypting device of FIG. 12: in the randomizing-encrypting device of FIG. 10 it is supplied by the control block divider 1001, element that this implementation lacks.

A complete description of the operation of this randomizing-encrypting device is not done here since it can be considered that the similarity with the descriptions offered in the methods of implementation of the randomizing-encrypting devices of FIG. 6 and FIG. 10 with the one of FIG. 12, which maintains common references, allows the understanding of which is the method of implementation of this device.

FIG. 13 shows possible diagram of variation of decrypting device for the decryption of randomized-encrypted text sequence generated with the variation of randomizing-encrypting device of FIG. 12. In FIG. 13, parts corresponding to common parts of FIG. 1, FIG. 4, FIG. 5, FIG. 7 and FIG. 11 are designated by same references.

The selected control block Ks in this variation of decrypting device 502v3 is the variation of selected control block Ksv consisting of the control initial block Z. The variation of selected control block Ksv arrives through secure channel 108 and is supplied to the generator of decryption control subblocks 401 which generates the decryption control subblocks $U_1$–$U_{52}$ that are supplied through input 311 to the encrypting-decrypting device 204. In this implementation the control initial block R of length preferably L2=G bits is fixed beforehand for the decryption of the randomized-encrypted text sequence Ys; it does not depend on the variation of selected control block Ksv.

The transformer block autonomous generator 5002 implements function F', so that it generates the transformer blocks WTJ from the fixed control initial block R, the same as the transformer block autonomous generator 5002 of FIG. 12. The control initial block R and the specific function F' that the transformer block autonomous generator 5002 implements are respectively equal to the used control initial block R and function F' implemented in the transformer block autonomous generator 5002 of the randomizing-encrypting device of FIG. 12 with which the randomized-encrypted text sequence Ys object of decryption was randomized-encrypted.

The complete description of the variation of decrypting device 502v3 is not done since it can be considered that the similarity with the descriptions offered in the methods of implementation of the decrypting devices of FIG. 7 and FIG. 12 with FIG. 13, together with the common references, allows the understanding of which is the method of implementation of this device.

INDUSTRIAL APPLICABILITY

The present invention is specially applicable in secret communications, maintenance of confidentiality of information, electronic commerce transactions, electronic mail communications and alike.

The specific implementation of the invention can be performed in many different ways and can depend on several factors like their application, the environment, the available and used technology, etcetera. A software implementation executed on electronic computers is possible. On the other hand, a hardware implementation can be possible where the elemental logic functions are in form of independent circuit units that can be built using discrete chip elements or preferably of several modules of very large scale integration (VLSI); microprocessors using "Read Only Memory" (ROM), or "Programmable Read Only Memory" (PROM), or "Electronically Erasable Read Only Memory" (EEROM) amongst many possible implementations. The hardware implementation has the advantage over the software implementation than can work substantially faster.

What is claimed is:

1. Data sequence randomization-encryption system that making use of freely selectable control block with plaintext sequence generates substantially at random sequence, comprising:

a first input means for receiving a plaintext sequence(X), a second input means for receiving a control block (Kp), an assembly means of blocks of length N (301) which assemble said plaintext sequence (X) in a plurality of plaintext blocks (XI), a control block dividing means (1001) which divide said control block (Kp) into a control initial block of length G (R) and a control initial block of length 2N (Z), a transformer block generating means (1002) which with said control initial block of length G (R) and a plurality corresponding randomized-encrypted text block (YI) generate a plurality of transformer blocks (WTI), a generating means of encryption control subblocks (202) which with said control initial block of length 2N (Z) generate a plurality of encryption control subblocks ($Z_1$–$Z_{52}$), a grouping means (603) which group corresponding said plaintext block (XI) and corresponding said transformer block (WTI), generating a grouped interblock (VI), a staged encrypting-decrypting means (204) which encrypt said grouped interblock (VI) with said plurality of encryption control subblocks ($Z_1$–$Z_{52}$), generating said randomized-encrypted text block (YI), an output supplying means (302) which supply plurality said randomized-encrypted text block (YI) making up a randomized-encrypted text sequence (Yp), whereby said randomized-encrypted text sequence (Yp) corresponds to said plaintext sequence (X) received by said first input means, wherein said transformer block generating means (1002) generate said transformer block (WTI;WTJ) implementing a function H (said control initial block of length G (R) said randomized-encrypted text block (YI;YJ)), wherein said grouping means (603) include an exclusive-OR operation, wherein said transformer block generating means (1002) implement said function H (said control initial block of length G (R) said randomized-encrypted text block (YI;YJ)) as for first said transformer block (WTI;WTJ) includes said control initial block of length G (R), for nth said transformer block (WTI;WTJ) is equal to nth minus one said randomized-encrypted text block (YI; YJ) XOR nth minus one said transformer block (WTI; WTJ).

2. The system of claim 1 wherein said transformer block generating means (1002) implement said function H (said control initial block of length G (R), said randomized-encrypted text block (YI;YJ)) for nth said transformer block (WTI; WTJ) equal to nth block of length N generated by a function En (said control initial block of length G (R)) XOR nth minus one said randomized-encrypted text block (YI; YJ).

3. The system of claim 2 wherein said transformer block generating means (1002) implement said function En (said control initial block of length G (R)) as $E_n(Ri)=(E_{n-1}(Ri) \text{ oper } B) \mod 2^{Qi}$, wherein said Qi less than or equal to 64 said Ri of length said Qi is subblock of said control initial block of length G (R), said oper arithmetic operation selected from the group consisting of addition and subtraction and shift, said B a value, said mod module operation.

4. The system of claim 3 wherein said control initial block of length 2N (Z) made up preferably of 128 bits and said control initial block of length G (R) made of preferably of 64 bits.

5. The system of claim 2 wherein said transformer block generating means (1002) implement said function $E_n$(said control initial block of length G (R)) including a random number generator.

6. The system of claim 5 wherein said control initial block of length 2N (Z) made up preferably of 128 bits and said control initial block of length G (R) made up preferably of seed length of said random number generator.

7. The system of claim 2 wherein said transformer block generating means (1002) implement said function $E_n$ (said control initial block of length G (R)) including a hash function.

8. The system of claim 7 wherein said control initial block of length 2N (Z) made up preferably of 128 bits and said control initial block of length G (R) made up preferably of zero or more bits.

9. The system of claim 1 wherein said control initial block of length 2N (Z) made up preferably of 128 bits and said control initial block of length G (R) made up preferably of 64 bits.

10. The system of claim 1 wherein said transformer block generating means (1002) implement said function H (said control initial block of length G (R), said randomized-encrypted text block (YI;YJ)) as for first said transformer block (WTI;WTJ) is said control initial block of length G (R), for nth said transformer block (WTI;WTJ) is nth minus one said randomized-encrypted text block (YI;YJ).

11. The system of claim 10 wherein said control initial block of length 2N (Z) made up preferably of 128 bits and said control initial block of length G (R) made up preferably of 64 bits.

12. The system of claim 1 wherein said transformer block generating means (1002) implement said function H (said control initial block of length G (R), said randomized-encrypted text block (YI;YJ)) for nth said transformer block (WTI;WTJ) equal to nth block of length N generated by a function $E_n$ (nth minus one said randomized-encrypted text block (YI;YJ)) XOR said control initial block of length G (R).

13. The system of claim 12 wherein said transformer block generating means (1002) implement said function En (nth minus one said randomized-encrypted text block (YI; YJ)) as $E_n(Yi)=(E_{n-1}(Yi) \text{ oper } B) \mod 2^{Qi}$, wherein said Qi less than or equal to 64, said Yi of length said Qi is subblock of said nth minus one said randomized-encrypted text block (YI;YJ), said oper arithmetic operation selected from the group consisting of addition and subtraction and shift, said B a value, said mod module operation.

14. The system of claim 13 wherein said control initial block of length 2N (Z) made up preferably of 128 bits and said control initial block of length G (R) made up preferably of 64 bits.

15. The system of claim 12 wherein said transformer block generating means (1002) implement said function $E_n$ (nth minus one said randomized-encrypted text block (YI; YJ)) including a hash function.

16. The system of claim 15 wherein said control initial block of length 2N (Z) made up preferably of 128 bits and said control initial block of length G (R) made up preferably of zero or more bits.

17. Data sequence randomization-encryption system that making use of control initial block of length 2N freely selectable with plaintext sequence generates substantially at random sequence, comprising:

a first input means for receiving a plaintext sequence (X), a second input means for receiving a control initial block of length 2N (Z), an assembly means of blocks of length N (301) which assemble said plaintext sequence (X) in a plurality of plaintext blocks (XI), a transformer block generating means (1002) which with a control initial block of length G (R) and a plurality corresponding randomized-encrypted text blocks (YI) generate a plurality of transformer blocks (WTI), a generating means of encryption control subblocks (202) which with said control initial block of length 2N (Z) generate a plurality of encryption control subblocks ($Z_1$–$Z_{52}$), a grouping means (603) which group corresponding said plaintext block (XI) and corresponding said transformer block (WTI), generating a grouped interblock (VI), a staged encrypting-decrypting means (204) which encrypt said grouped interblock (VI) with said plurality of encryption control subblocks ($Z_1$–$Z_{52}$), generating said randomized-encrypted text block (YI), an output supplying means (302) which supply plurality said randomized-encrypted text block (YI) making up a randomized-encrypted text sequence (Yp), whereby said randomized-encrypted text sequence (Yp) corresponds to said plaintext sequence (X) received by said first input means, wherein said transformer block generating means (1002) generate said transformer block (WTI;WTJ) implementing a function H (said control initial block of length G (R) said randomized-encrypted text block (YI;YJ)), wherein said grouping means (603) include an exclusive-OR operation, wherein said transformer block generating means (1002) implement said function H (said control initial block of length G (R), said randomized-encrypted text block (YI;YJ)) as for first said transformer block (WTI;WTJ) includes said control initial block of length G (R), for nth said transformer block (WTI;WTJ) is equal to nth minus one said randomized-encrypted text block (YI; YJ) XOR nth minus one said transformer block (WTI; WTJ).

18. The system of claim 17 wherein said control initial block of length 2N (Z) made up preferably of 128 bits and said control initial block of length G (R) made up preferably of 64 bits.

19. Data sequence randomization-encryption system that making use of freely selectable control block with plaintext sequence generates substantially at random sequence, comprising:

a first input means for receiving a plaintext sequence(X), a second input means for receiving a control block (Kp), an assembly means of blocks of length N (301) which assemble said plaintext sequence (X) in a plurality of plaintext blocks (XI), a control block dividing means (1001) which divide said control block (Kp) into a control initial block of length G (R) and a control initial block of length 2N (Z), a transformer block generating means (1002) which with said control initial block of length G (R) and a plurality corresponding randomized-encrypted text block (YI) generate a plurality of transformer blocks (WTI), a generating means of encryption control subblocks (202) which with said control initial block of length 2N (Z) generate a plurality of encryption control subblocks ($Z_1$–$Z_{52}$), a grouping means (603) which group corresponding said plaintext block (XI) and corresponding said transformer block (WTI), generating a grouped interblock (VI), a staged encrypting-decrypting means (204) which encrypt said grouped interblock (VI) with said plurality of encryption control subblocks ($Z_1$–$Z_{52}$), generating said randomized-encrypted text block (YI), an output supplying means (302) which supply plurality said randomized-encrypted text block (YI) making up a randomized-encrypted text sequence (Yp), whereby said randomized-encrypted text sequence (Yp) corresponds to said plaintext sequence (@) received by said first input means, wherein said transformer block generating means (1002) generate said transformer block (WTI;WTJ) implementing a function H (said control initial block of length G (R), said randomized-encrypted text block (YI;YJ)), wherein said grouping means (603) include an exclusive-OR operation, wherein said transformer block generating means (1002) implement said function H (said control initial block of length G (R), said randomized-encrypted text block (YI;YJ)) as for first said transformer block (WTI;WTJ) is said control initial block of length G (R), for nth said transformer block (WTI;WTJ) is nth minus one said randomized-encrypted text block (YI;YJ).

20. The system of claim 19 wherein said control initial block of length 2N (Z) made up preferably of 128 bits and said control initial block of length G (R) made up preferably of 64 bits.

21. Data sequence randomization-encryption system that making use of control initial block of length 2N freely selectable with plaintext sequence generates substantially at random sequence, comprising:

a first input means for receiving a plaintext sequence (X), a second input means for receiving a control initial block of length 2N (Z), an assembly means of blocks of length N (301) which assemble said plaintext sequence (X) in a plurality of plaintext blocks (XI), a transformer block generating means (1002) which with a control initial block of length G (R) and a plurality corresponding randomized-encrypted text blocks (YI) generate a plurality of transformer blocks (WTI), a generating means of encryption control subblocks (202) which with said control initial block of length 2N (Z) generate a plurality of encryption control subblocks ($Z_1$–$Z_{52}$), a grouping means (603) which group corresponding said plaintext block (XI) and corresponding said transformer block (WTI), generating a grouped interblock (VI), a staged encrypting-decrypting means (204) which encrypt said grouped interblock (VI) with said plurality of encryption control subblocks ($Z_1$–$Z_{52}$), generating said randomized-encrypted text block (YI), an output supplying means (302) which supply plurality said randomized-encrypted text block (YI) making up a randomized-encrypted text sequence (Yp), whereby said randomized-encrypted text sequence (Yp) corresponds to said plaintext sequence (X) received by said first input means, wherein said transformer block generating means (1002) generate said transformer block (WTI;WTJ) implementing a function H (said control initial block of length G (R), said randomized-encrypted text block (YI;YJ)), wherein said grouping means (603) include an exclusive-OR operation, wherein said transformer block generating means (1002) implement said function H (said control initial block of length G (R), said randomized-encrypted text block (YI;YJ)) as for first said transformer block (WTI;WTJ) is said control initial block of length G (R), for nth said transformer block (WTI;WTJ) is nth minus one said randomized-encrypted text block (YI;YJ).

22. The system of claim 21 wherein said control initial block of length 2N (Z) made up preferably of 128 bits and said control initial block of length G (R) made up preferably of 64 bits.

* * * * *